United States Patent
Hesson et al.

[11] Patent Number: 5,636,157
[45] Date of Patent: Jun. 3, 1997

[54] MODULAR 64-BIT INTEGER ADDER

[75] Inventors: James H. Hesson; Steven C. Espy, both of Chittenden County, Vt.

[73] Assignee: International Business Machines Corporation, Armonk, N.Y.

[21] Appl. No.: 317,073

[22] Filed: Oct. 3, 1994

[51] Int. Cl.$^6$ ............................................. G06F 7/50
[52] U.S. Cl. ............................................. 364/788
[58] Field of Search ............................. 364/784, 786, 364/787, 788

[56] References Cited

U.S. PATENT DOCUMENTS

| | | | |
|---|---|---|---|
| 3,031,140 | 4/1962 | Cooper | 364/786 |
| 4,228,520 | 10/1980 | Letteney et al. | 364/760 |
| 4,559,608 | 12/1985 | Young et al. | 364/786 |
| 4,682,303 | 7/1987 | Uya | 364/788 |
| 4,689,763 | 8/1987 | Fang | 364/784 |
| 4,870,609 | 9/1989 | Yasui et al. | 364/784 |
| 5,018,093 | 5/1991 | Shih | 364/740 |
| 5,027,311 | 6/1991 | Zion | 364/788 |
| 5,027,312 | 6/1991 | Knauer et al. | 364/788 |
| 5,134,579 | 7/1992 | Oki et al. | 364/786 |
| 5,198,993 | 3/1993 | Makakura | 364/788 |
| 5,396,445 | 3/1995 | Lal | 364/788 |

OTHER PUBLICATIONS

IBM Technical Disclosure Bulletin, vol. 30, No. 10, Mar. 1988, "Lookahead Carry Select Adder for High Performance Computer Processors", pp. 331–334.

Primary Examiner—Chuong D. Ngo
Attorney, Agent, or Firm—Whitham, Curtis, Whitham & McGinn; Susan M. Murray

[57] ABSTRACT

A high speed, compact low power integer adder unit for advanced microprocessors features modular construction, low gate count and a fast add time. A 64-bit implementation is characterized by a unique combination of dual rail logic circuits and dual carry select path within each of four 16-bit adder building blocks to achieve a one gate delay increment for each additional 16-bit adder building block after the first. Each of the 16-bit adder building blocks are composed of modules that receive four of sixteen bits of the operands, and each of the modules are comprised of submodules. The submodules are in turn comprised of dual rail logic circuits with a dual carry select path so as to constitute a nested carry select architecture wherein the nesting of the dual carry select path extends from submodules to a module and from modules to a basic building block. The dual carry select paths are optimized both internal to the submodules and modules and at the submodule and module boundaries to achieve a minimum gate delay number.

8 Claims, 20 Drawing Sheets

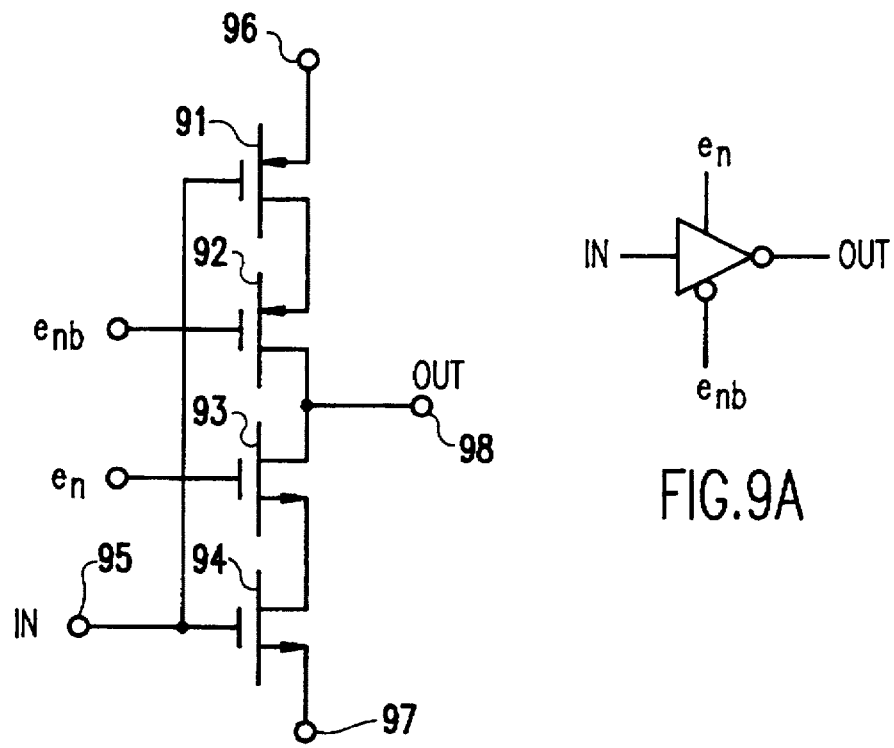
FIG.9
FIG.9A
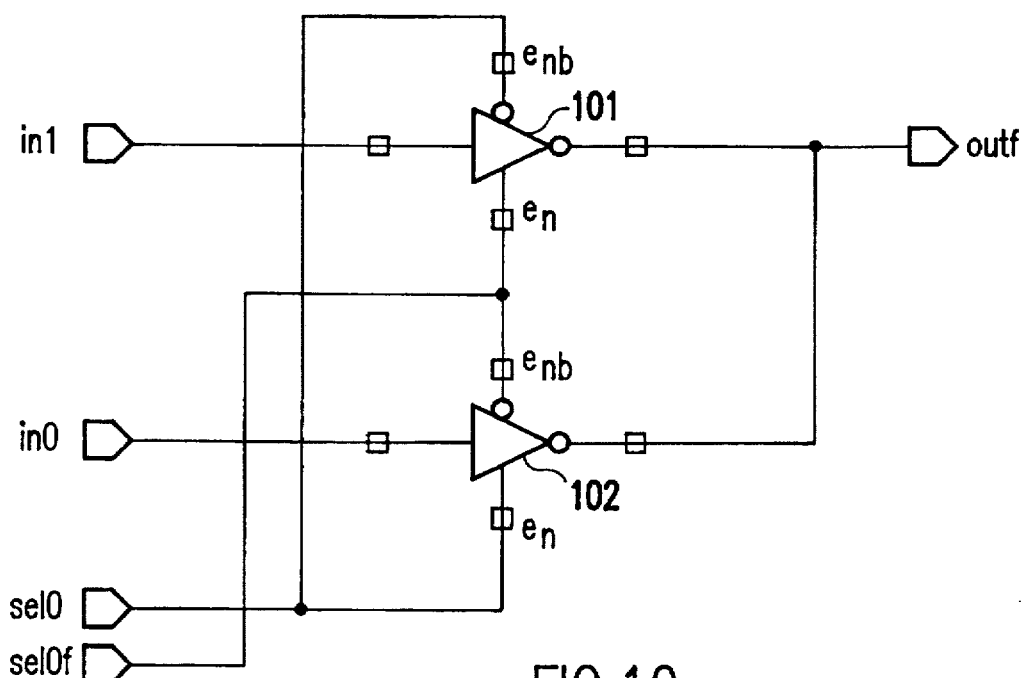
FIG.10

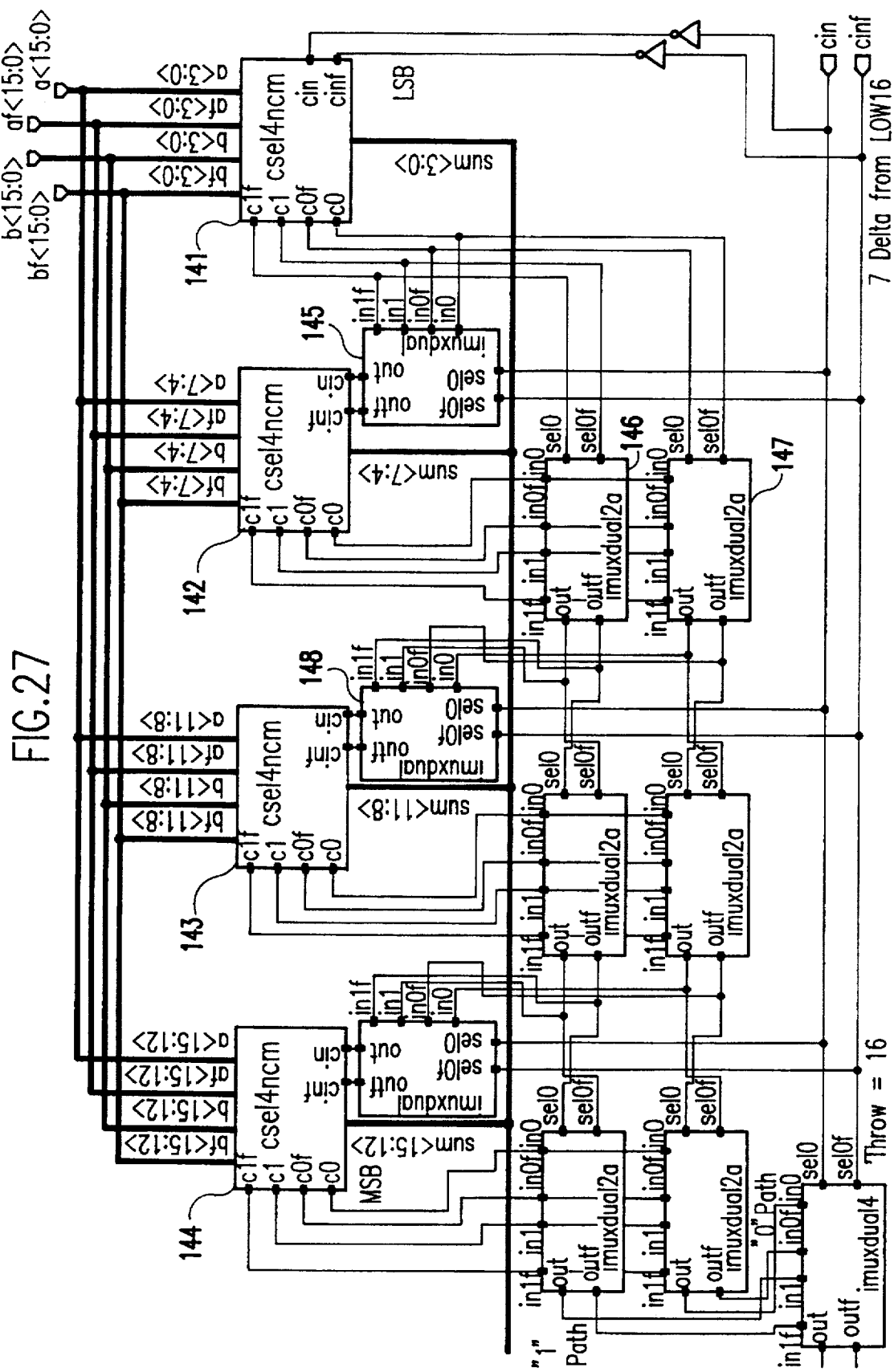

MODULAR 64-BIT INTEGER ADDER

BACKGROUND OF THE INVENTION

1. Field of the Invention

The present invention generally relates to arithmetic units for digital computers and, more particularly, to the implementation of a compact, high speed, fully static 64-bit integer adder for advanced microprocessors.

2. Description of the Prior Art

In the design and implementation of advanced microprocessors, one of the primary building blocks is an integer adder. It is used as a building block in a fixed point unit, a load/store address generation unit, and in the design of a floating point adder and multiplication unit. Various width integer adds are required from 16-bit to 64-bit to even 128-bit lengths. Furthermore, ah integer comparator is easily formed as a degenerate case of the integer adder and is a second high use building block. It is therefore desirable to generalize the construction and design of the adder unit so that all the functional units can benefit from the design time and physical layout effort involved to design and develop a state-of-the art adder design.

SUMMARY OF THE INVENTION

It is therefore an object of the present invention to provide a high speed, compact low power integer adder unit for advanced microprocessors.

It is another object of the invention to provide an integer adder unit which features modular construction, low gate count and a fast add time.

It is a further object of the invention to provide a high speed integer adder unit constructed to scale well with advanced complementary metal oxide semiconductor (CMOS) process generations.

According to a 64-bit implementation of the invention, there is provided a unique combination of dual rail logic circuits and dual carry select path within each of four 16-bit adder building blocks to achieve a one gate delay increment for each additional 16-bit adder building block after the first. Each of the 16-bit adder building blocks are composed of modules that receive four of sixteen bits of the operands, and each of the modules are comprised of submodules. The submodules are in turn comprised of dual rail logic circuits with a dual carry select path so as to constitute a nested carry select architecture wherein the nesting of the dual carry select path extends from submodules to a module and from modules to a basic building block. The initial adder building block, termed the "low 16" adder building block because it receives the sixteen least significant bits, and the subsequent adder building blocks, termed the "other 16" adder building blocks, have dual carry select paths that are optimized both internal to the submodules and modules and at the submodule and module boundaries to achieve a minimum gate delay number.

Other adder modules can be constructed as simple byproducts of the basic adder modules and submodules. The adder implementation has a low total metal oxide semiconductor field effect transistor (MOSFET) count and low local and no global interconnect requirements to provide a small physical layout that will remain fast as the physical design is scaled with more advanced technologies as parasitic effects are minimized.

The invention realizes advantages in terms of speed, size, interconnection, power and complexity over the prior art. The speed advantage is achieved by maintaining a small absolute gate count in terms of simple gates and a design which produces the least significant sum outputs at a faster rate than the most significant sum outputs. In general, modules that follow the adder block can benefit from this behavior. The size advantage is achieved by virtue of the fact that the absolute gate count is low and the logic device structures utilized can be densely packed by sharing source and drain areas. The interconnect advantage is reflected by the fact that the interconnection within a 16-bit module is modest and module to module interconnect is restricted along 16-bit boundaries. Power is minimized by sizing only the critical paths and maintaining a fully static design throughout. Complexity is minimized as there are no special timing paths to support carry or sum generation.

BRIEF DESCRIPTION OF THE DRAWINGS

The foregoing and other objects, aspects and advantages will be better understood from the following detailed description of a preferred embodiment of the invention with reference to the drawings, in which:

FIG. 9 is a schematic diagram of the circuitry of a tri-inverter buffer circuit, and FIG. 9A is a block diagram showing the symbol for the tri-inverter buffer circuit;

FIG. 10 is a logic unit composed of two tri-inverter buffer circuits which is also the schematic diagram of the IMUXSEL submodule (FIG. 13);

FIG. 27 is a block diagram of the "other" 16 building block expanded into two unique modules;

DETAILED DESCRIPTION OF A PREFERRED EMBODIMENT OF THE INVENTION

Figure 1:
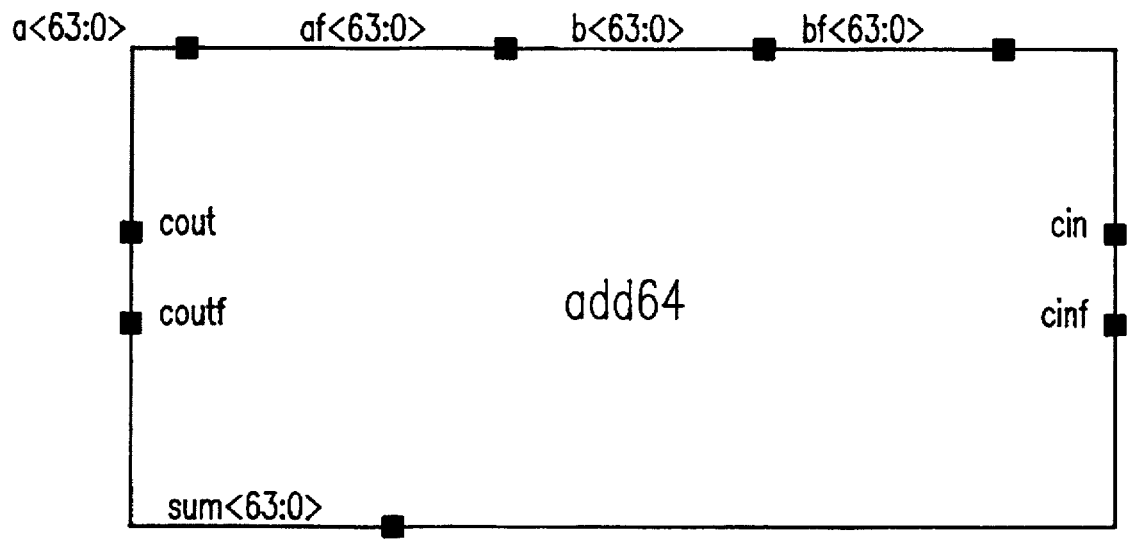
FIG. 1 is a top level schematic of the 64-bit adder according to the preferred embodiment of the invention.

Referring now to the drawings, and more particularly to FIG. 1, there is shown the top level schematic diagram of the 64-bit adder unit according to a preferred embodiment of the invention. The operands are indicated as a<63:0> and its complement af<63:0>, b<63:0> and its complement bf<63:0>, the carry in cin and its complement cinf, the sum output s<63:0>, and the carry out cout and its complement coutf.

Figure 2:
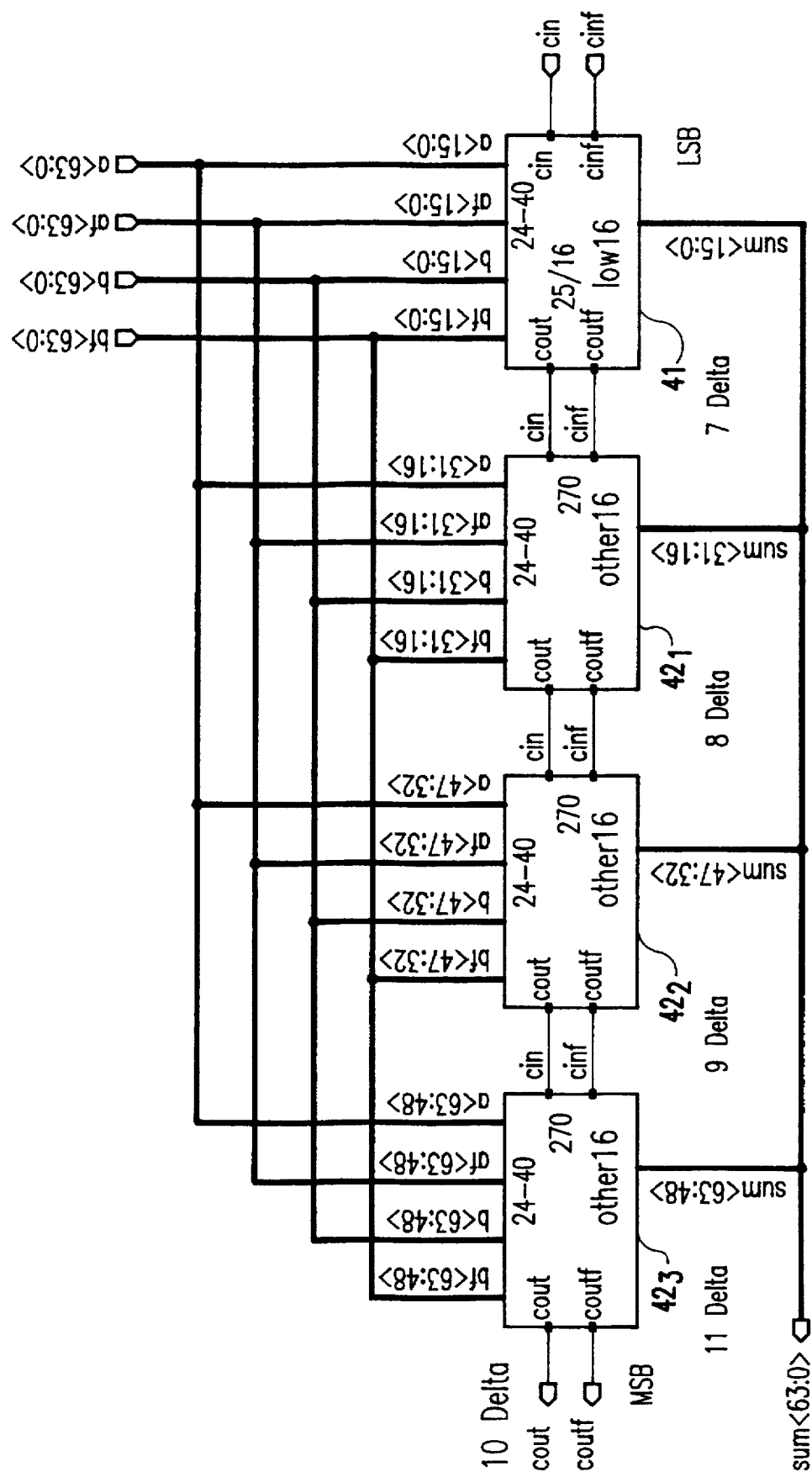
FIG. 2 is a block diagram of the 64-bit adder showing the relationship of the "low 16" and the "other 16" building blocks which comprise the adder.

FIG. 2 shows the construction of the 64-bit adder in terms of two basic building blocks. The first of these 41, denoted "low 16", is used once, and the second $42_1$, $42_2$ and $42_3$, each denoted "other 16", is used three times. The input and outputs of these blocks are labeled, and it will be observed that each of these two building blocks receives sixteen bits of each of the operands and provides a sixteen bit sum output. The sum outputs for each of the four building blocks of this example combine to provide the 64-bit sum output for the adder. The carry in signal cin and its complement cinf for each building block are supplied by the cout signal and its complement coutf from the preceding block, providing the dual carry select path for the adder. The FET count is 4,806 in a size of 125,000 $\mu m^2$ and a power consumption of 41 mW. Also shown in FIG. 2 is the gate delay from carry in to both sum and carry out for each block and across the entire 64-bit adder block. Note that the gate delay is one gate increment for each additional 16-bit adder module $42_1$, $42_2$ and $42_3$ after the first 16-bit adder module 41.

Figure 3:
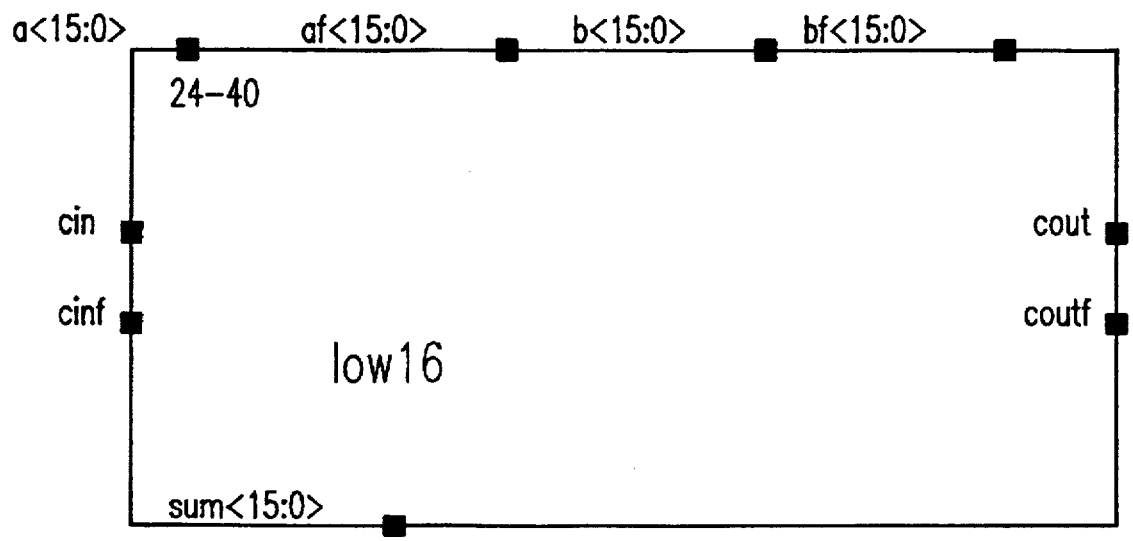
FIG. 3 is the "low 16" adder building block input/output (I/O) definition.

The input/output (I/O) definition of the "low 16" building block is shown in FIG. 3. This block receives the first sixteen bits of the operands a and b and their complements af and bf, beginning with the least significant bit (LSB). The operands are indicated as a<15:0> and its complement af<15:0>, b<15:0> and its complement bf<15:0>, the carry in cin and its complement cinf, the sum output s<15:0>, and the carry out cout and its complement coutf.

Figure 4:
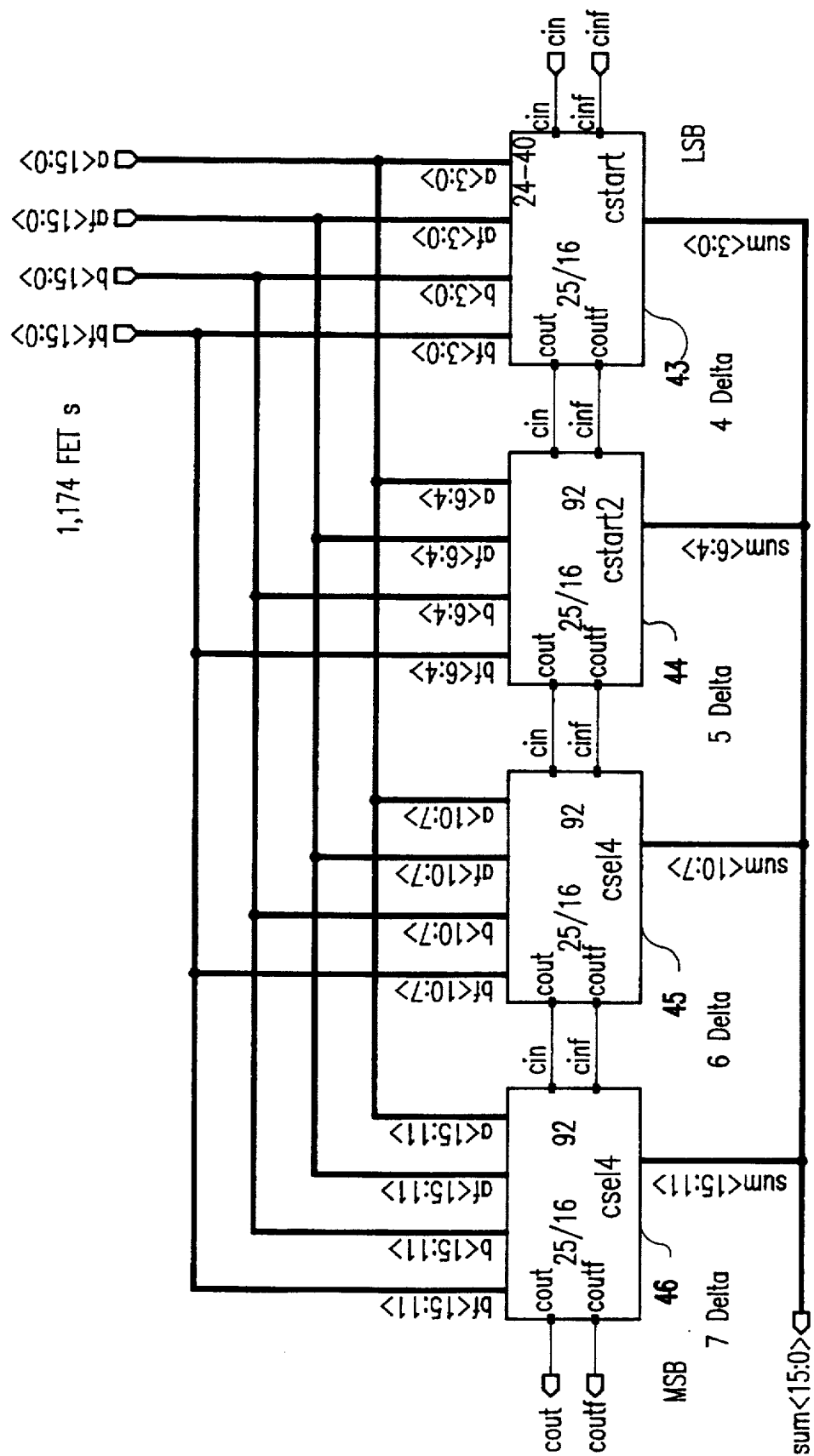
FIG. 4 is a block diagram showing the "low 16" building block expanded into three unique modules.

The "low 16" building block is shown in FIG. 4 as comprising three unique modules, two carry start modules, CSTART 43 and CSTART2 44, and carry select modules, CSEL4, 45 and 46. The first and second carry start submodules, CSTART and CSTART2, are each used once, and the carry select submodules, CSEL4, is used twice. It is also possible to form the "low 16" block with a CSTART submodule and three CSTART2 submodules. In the latter case, the principle of operation is entirely equivalent. The basic architecture of the "low 16" block is similar to that shown in FIG. 2 except that now each of the modules is a 4-bit module rather than a 16-bit module. In FIG. 4, the gate delay is shown for each block, and again notice that there is only a one gate delay increment for each submodule after the first. The critical path is cin+a<15>+b<15>→cout.

Figure 5:
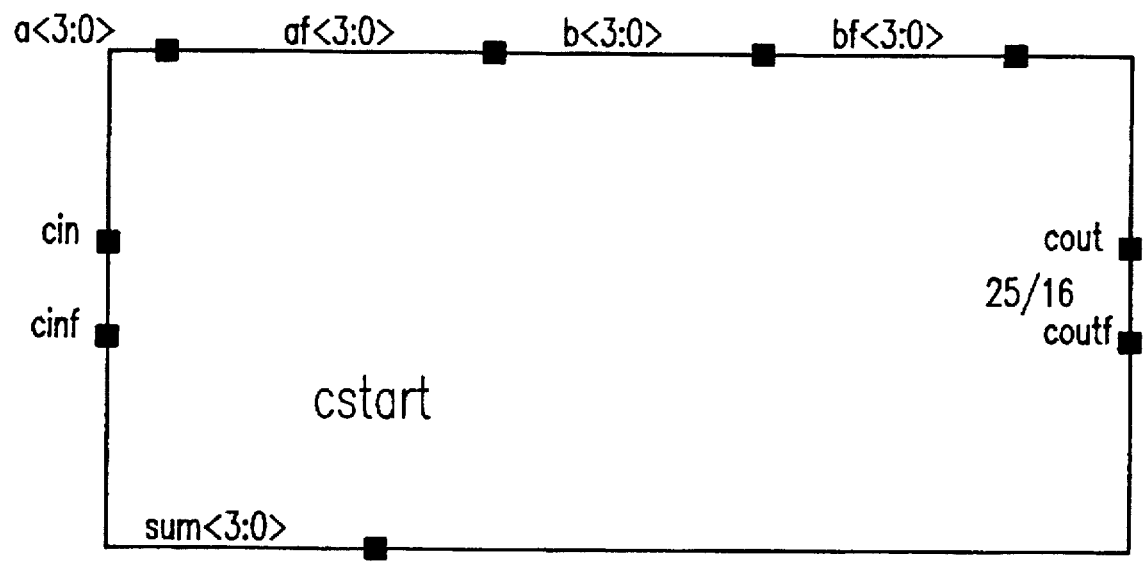
FIG. 5 is the CSTART module I/O definition.

The I/O definition of the CSTART module is shown in FIG. 5. This block receives the four LSBs of the operands. The operands are indicated as a<3:0> and its complement af<3:0>, b<3:0> and its complement bf<3:0>, the carry in cin and its complement cinf, the sum output s<3:0>, and the carry out cout and its complement coutf.

Figure 6:
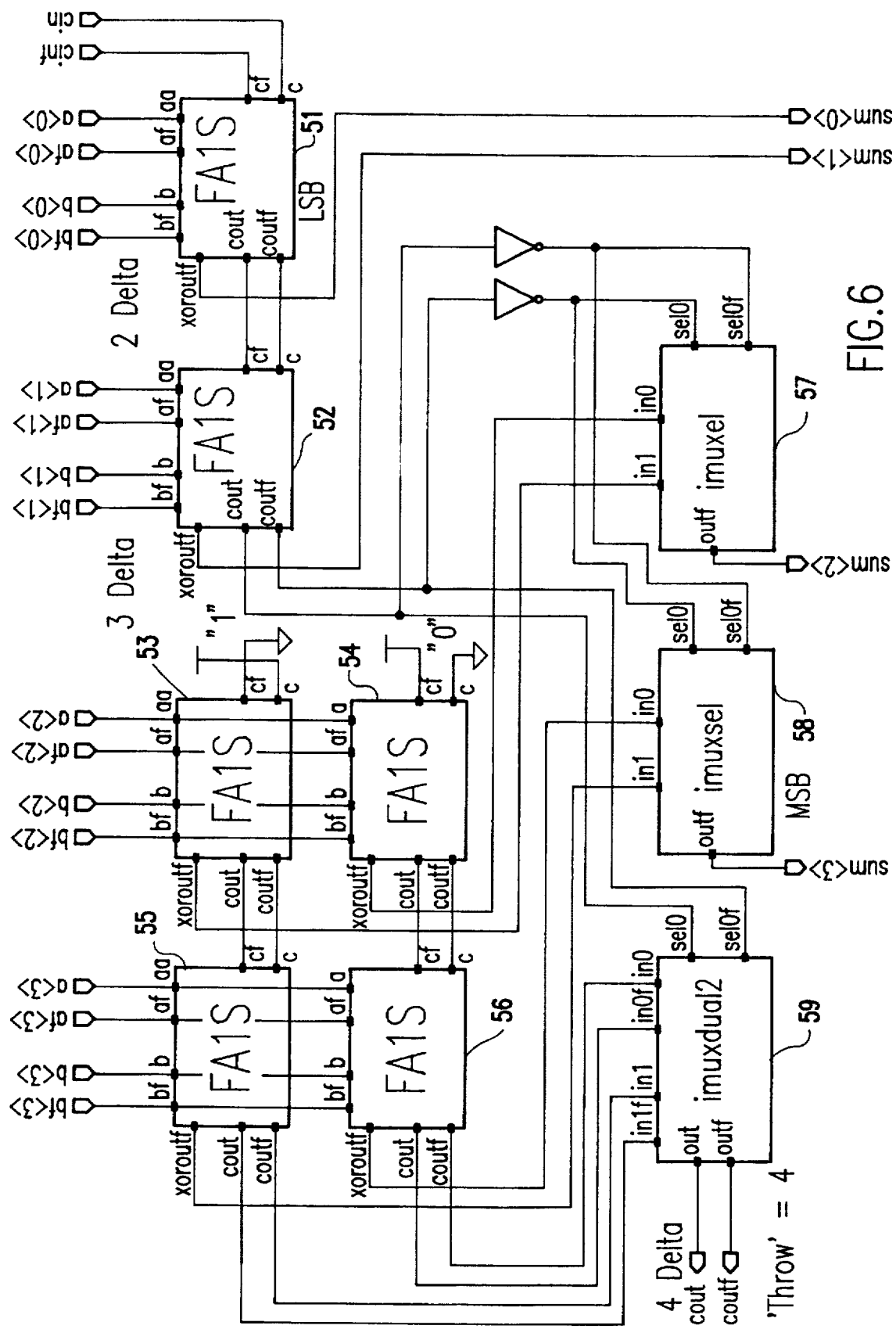
FIG. 6 is a block diagram showing the CSTART module expanded into four unique submodules.

The CSTART module is shown in FIG. 6 as being comprised of four unique submodules, two full adder submodules, FA1S_A2 and FA1S_A3, and two multiplexer submodules, IMUXSEL and IMUXDUAL. The first full adder submodule, FA1S_A2, is used twice at 51 and 52, the second full adder submodule, FA1S_A3, is used four times at 53, 54, 55, and 56, the first multiplexer submodule, IMUXSEL, is used twice at 57 and 58, and the second multiplexer submodule, IMUXDUAL, is used once at 59. The full adder submodule 51 receives the cin and cinf signals as well as the LSBs of the operands and generates the LSB of the sum output. The full adder submodule 52 receives the next bits of the operands and the cout and coutf signals from full adder submodule 51 and generates the next bit of the sum output. The full adder submodules 53 and 54 both receive the next or third bits of the operands. In the case of the full adder submodule 53, the cin input is wired to a logic "1" and the cinf input is wired to a logic "0". In the case of the full adder submodule 54, the cin input is wired to a logic "0" and the cinf input is wired to a logic "1". The sum outputs of the full adder submodules 53 and 54 are supplied as inputs to the multiplexer 57. The full adder submodules 55 and 56 both receive the next or fourth bits of the operands. The sum outputs of the full adder submodules 55 and 56 are supplied as inputs to the multiplexer 58, and the cout and coutf outputs of the full adder submodules 55 and 56 are supplied to the dual multiplexer 59. The selection signal sel0 and its complement sel0f for each of the multiplexers 57, 58 and 59 are the cout and coutf signals, respectively, from full adder submodule 52. The inverters shown in the diagram are for purposes of drive only and the logical values of the signals have been inverted accordingly. Thus, while the first two bits of the sum are generated by full adder submodules 51 and 52 directly, the next two bits are generated by assuming that the cout signal from full adder submodule will be a logic "1" in full adder submodules 53 and 55 and by assuming that the cout signal from full adder submodule 52 will be a logic "0" in full adders submodules 54 and 56. Not until the cout signal is actually generated by full adders submodule 52 are the correct sum bits selected by the multiplexers 57 and 58.

Figure 7:
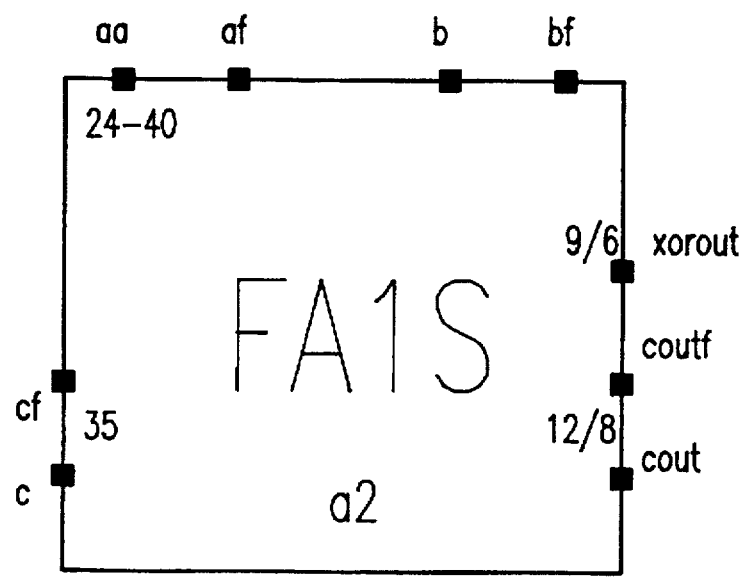
FIG. 7 is the $FA1S_{13}$ A2 submodule I/O definition.

The I/O definition of the FA1S_A2 submodule is shown in FIG. 7. The operands are indicated as aa and its complement af, b and its complement bf, the carry in c and its complement cf, an Exclusive OR output xorout, and the carry out cout and its complement coutf. As is understood in the art, the Exclusive OR output is the same as the sum output for a full adder logic block. Note that there is no complement of the sum output in this definition.

Figure 8:
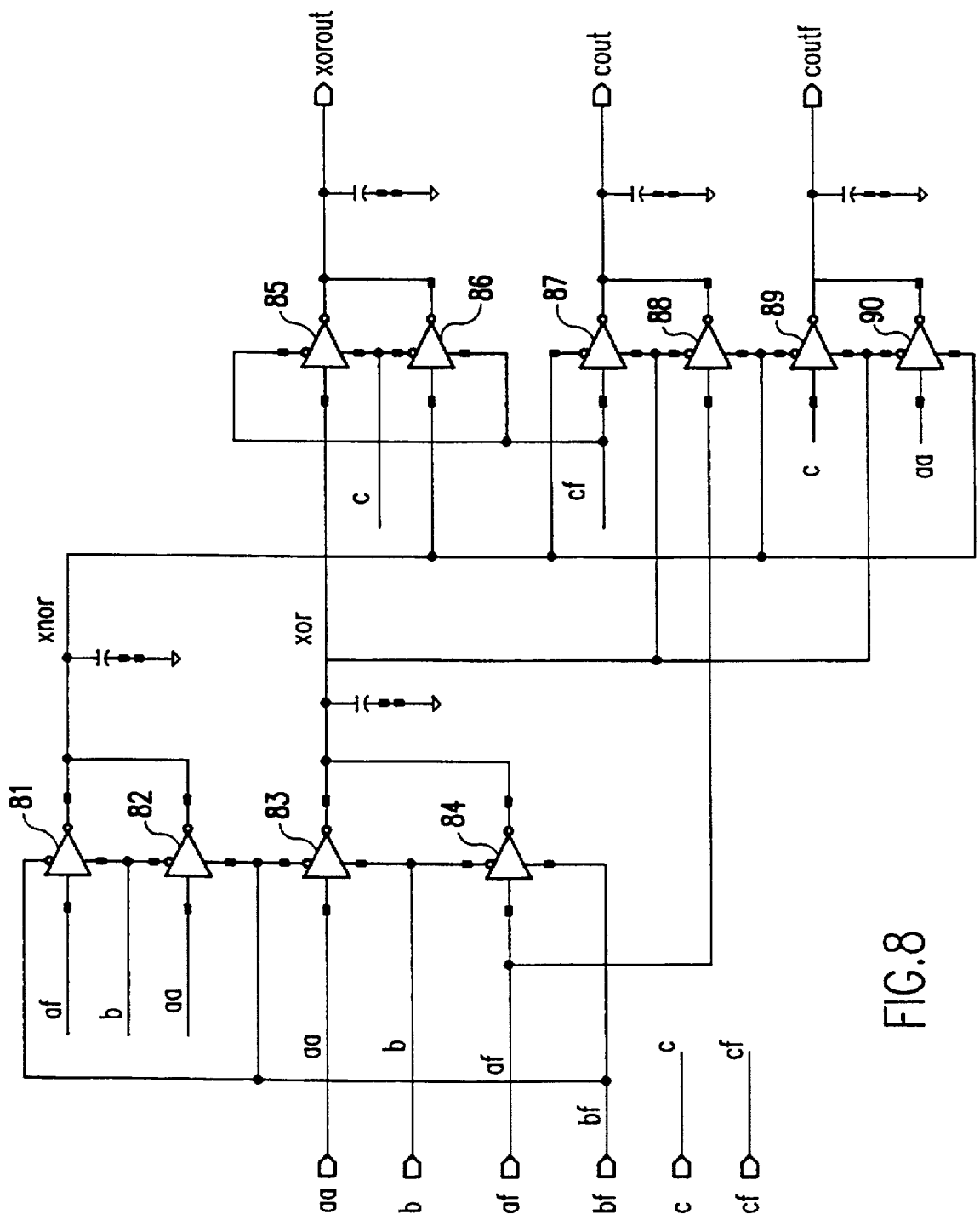
FIG. 8 is a schematic diagram of the $FA1S_{13}$ A2 submodule.

FIG. 8 shows the circuit of the FA1S-A2 full adder submodule as comprising ten tri-inverter buffer circuits, each of which is composed of four FETs, for a total FET count of forty. The basic tri-inverter buffer circuit is shown in FIG. 9 as composed of a pair of n-channel FETs 91 and 92 and a pair of p-channel FETs 93 and 94. The gates of each of FETs 91 and 94 are connected in common to a common input terminal 95. The gate of FET 93 is connected to a first select control terminal which receives an inhibit signal en, while the gate of FET 93 is connected a second select control terminal which receives the complement of signal en, here shown as enb. The source of FET 91 is connected to a source of voltage at terminal 96, while the source of FET 94 is connected to a voltage reference, such as circuit ground, at terminal 97. The common connection of the sources of FETs 92 and 93 provides the output 98 of the tri-inverter circuit. The symbol for the tri-inverter circuit is shown in FIG. 9A. Two of the tri-inverter circuits, 101 and 102, comprise a logic unit as shown in FIG. 10, having the following truth table:

| in1 | in0 | sel0 | sel0f | outf | |
|---|---|---|---|---|---|
| x | 0 | 1 | 0 | 1 | } pass complement of in0 |
| x | 1 | 1 | 0 | 0 | |
| 0 | x | 0 | 1 | 1 | } pass complement of in1 |
| 1 | x | 0 | 1 | 0 | | where x=don't care. When the input in1 is A, the input in0 is $\overline{A}$, the first select sel0 is $\overline{B}$, and the second select sel0f is B, the logic function of the unit shown in FIG. 10 is that of Exclusive OR (XOR). By interchanging the inputs A and $\overline{A}$, the logic function of the unit is the inverse, or $\overline{XOR}$. Looking at the circuit in FIG. 10 another way, the circuit operates as a multiplexer in which the selection signal sel0 and its complement sel0f serve to select either in1 or in0 as the output outf; that is, the complement of the selected input signal.

Returning to FIG. 8, the ten tri-inverter buffer circuits are arranged in five pairs. The first two pairs comprising tri-inverter buffers 81, 82 and 83, 84 perform the $\overline{XOR}$ and XOR functions for inputs aa, af, b, and bf, as described with reference to FIG. 10. The $\overline{XOR}$ output of tri-inverter buffer circuit pair 81, 82 is supplied first of all as the input to tri-inverter buffer circuit 86 and secondly as the selection signal sel0 to each of tri-inverter buffer circuit pairs 87, 88 and 89, 90. Similarly, the XOR output of tri-inverter buffer circuit pair 83, 84 is supplied as the input to tri-inverter buffer circuit 85 and as the selection signal sel0f to each of tri-inverter buffer circuit pairs 87, 88 and 89, 90. The sel0 selection signal for tri-inverter buffer pair 84, 86 is the carry in signal c, while the sel0f selection signal for the pair is the inverse or cf. The output of this tri-inverter buffer pair is the sum or xorout. The inverse of the carry in signal cf is also applied to the input of tri-inverter buffer 87, and the carry in signal c is also applied to the input of tri-inverter buffer 89. The input to tri-inverter buffer 88 is the inverse of the aa operand or af, and therefore the output of the tri-inverter buffer pair 87, 88 ia cout. The input to tri-inverter buffer 90 is aa operand, and therefore the output of the tri-inverter pair 89, 90 is coutf.

Figure 11:
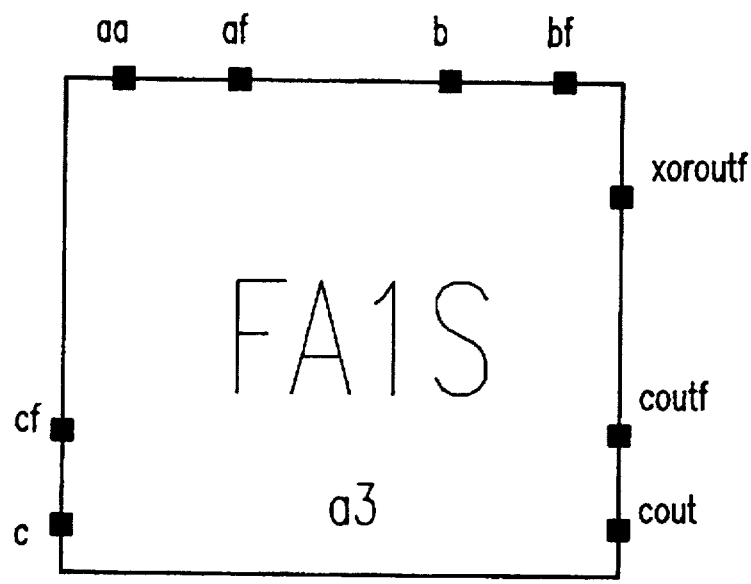
FIG. 11 is the FA1S__A3 submodule I/O definition.
Figure 12:
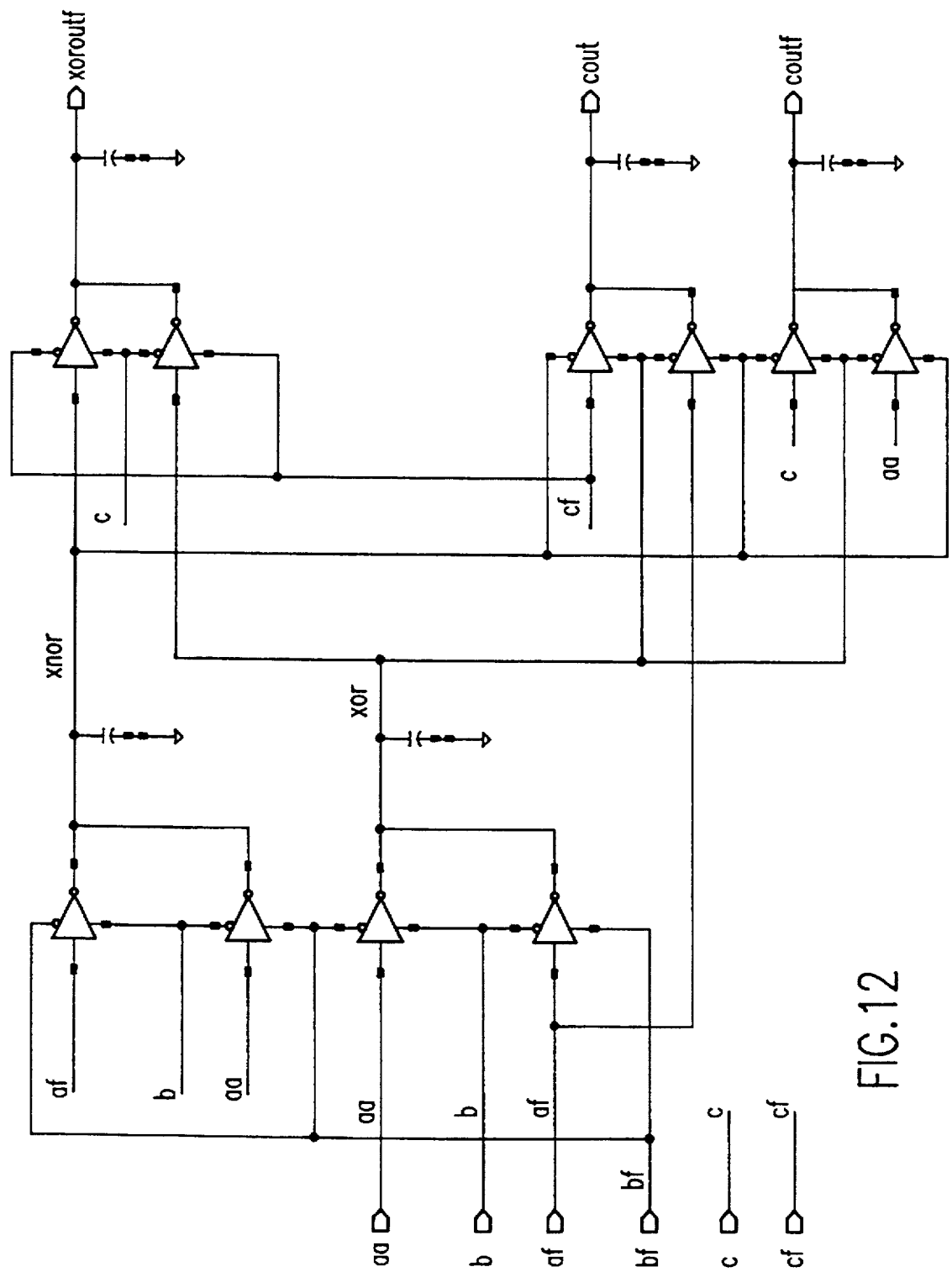
FIG. 12 is the IMUXSEL submodule I/O definition.

The I/O definition of the FAIS__A3 full adder submodule is shown in FIG. 11. It is essentially identical to that of the FA1S__A2 full adder submodule except that the Exclusive OR output is complemented as xoroutf. Likewise, the circuit of the FA1S__A3 submodule as shown in FIG. 12 is essentially the same as that for the FA1S__A2 full adder submodule shown in FIG. 8 except that the sum output is deleted and its complement is provided instead.

Figure 13:
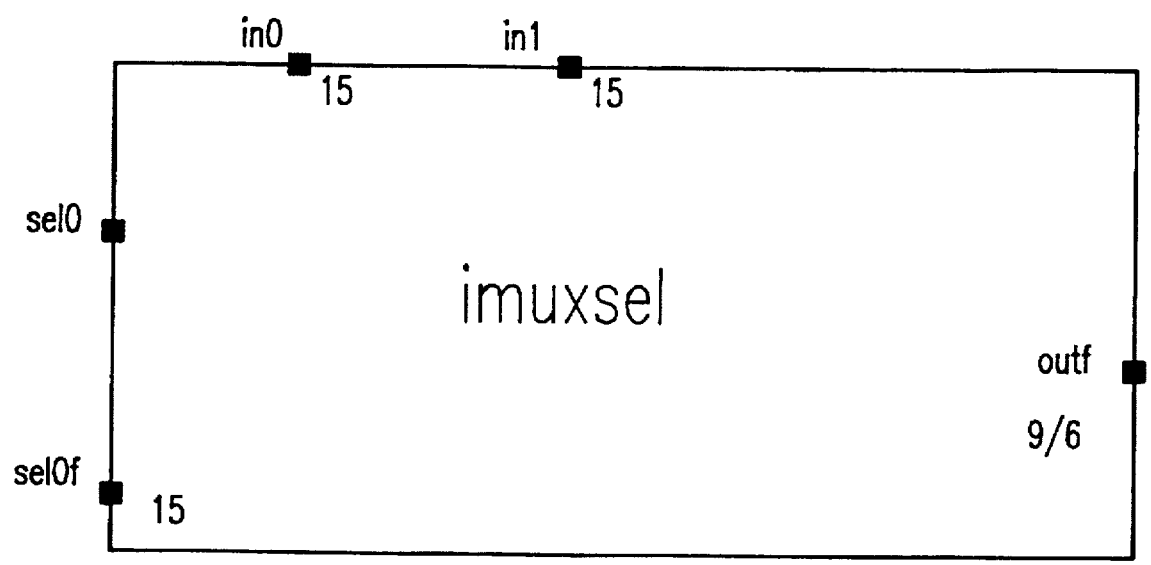
FIG. 13 is the IMUXSEL submodule I/O definition.

FIG. 13 is the I/O definition for the IMUXSEL multiplexer submodule. This multiplexer circuit has inputs in0 and in1, a selection input sel0 and its complement sel0f, and a complemented output outf. The circuit of the IMUXSEL submodule is shown in FIG. 10 as comprising two tri-inverter buffer circuits for an FET count of eight.

Figure 14:
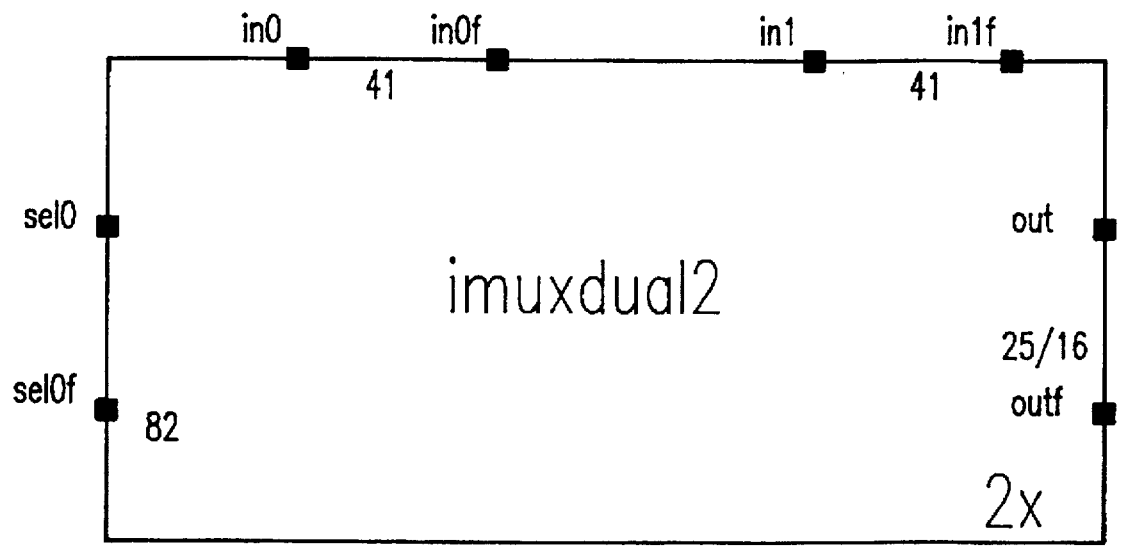
FIG. 14 is the IMUXDUAL2 submodule I/O definition.
Figure 15:
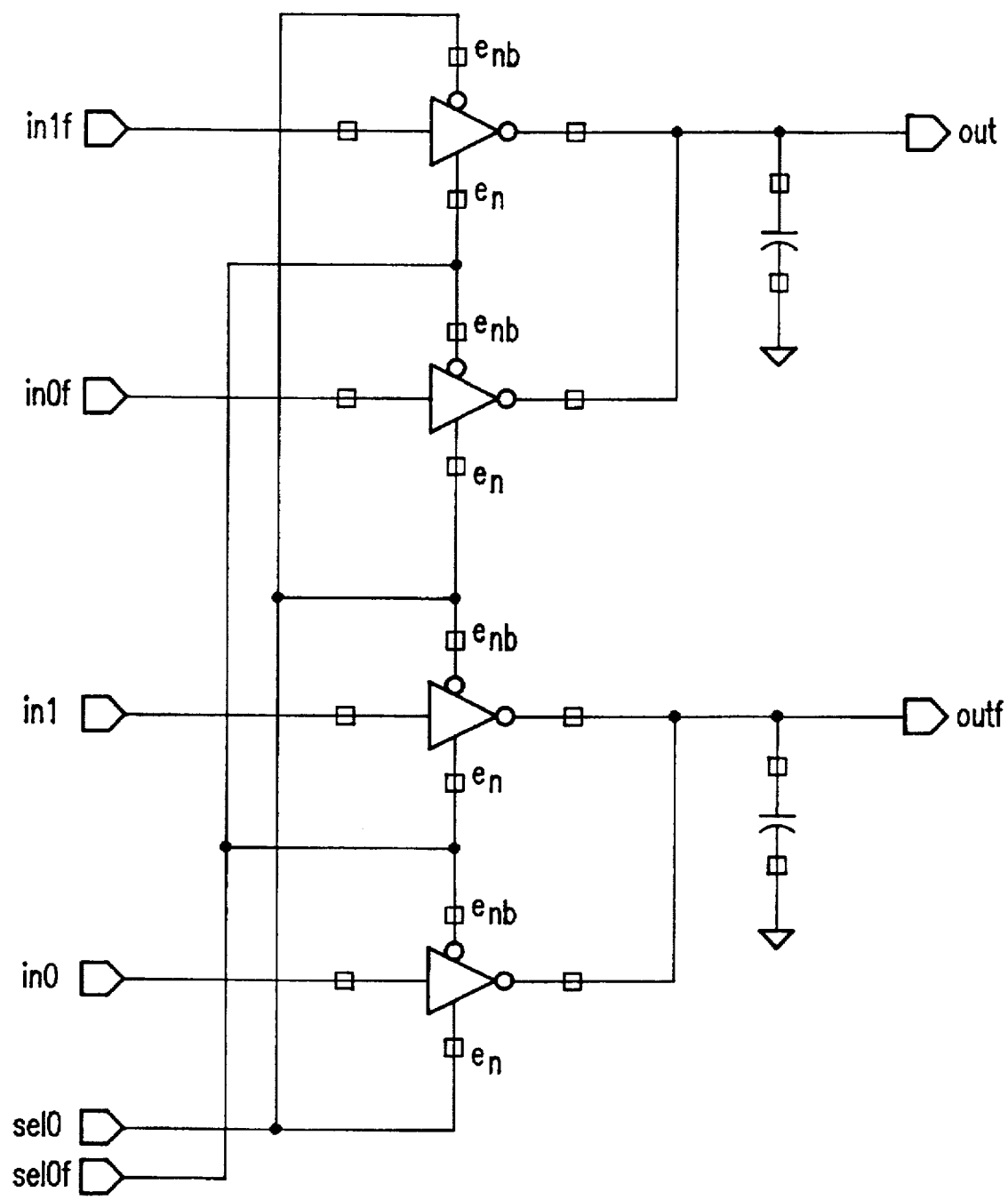
FIG. 15 is a schematic diagram of the IMUXDUAL2 submodule.

FIG. 14 is the I/O definition for the IMUXDUAL2 multiplexer submodule. This is a dual multiplexer circuit having two pairs of inputs in0 and its complement in0f and in1 and its complement in1f, a selection input sel0 and its complement sel0f, and an output out and its complement outf. The circuit, as shown in FIG. 15, is two of the basic multiplexer circuits shown in FIG. 10 and is composed of four tri-inverter buffer circuits for an FET count of sixteen.

From this level of the description, the nested architecture of the integer adder is now quite clear. Each of the 16-bit adder building blocks are composed of modules that receive four of sixteen bits of the operands, and each of the modules are comprised of submodules. The submodules are in turn comprised of dual rail logic circuits with a dual carry select path so as to constitute a nested carry select architecture wherein the nesting of the dual carry select path extends from submodules to a module and from modules to a basic building block. While carry select is known in integer adders, this nested carry select architecture is unique to the present invention and permits the simple high density and inexpensive modular construction of the adder. The dual carry select paths are optimized both internal to the submodules and modules and at the submodule and module boundaries to achieve a minimum gate delay number.

Figure 16:
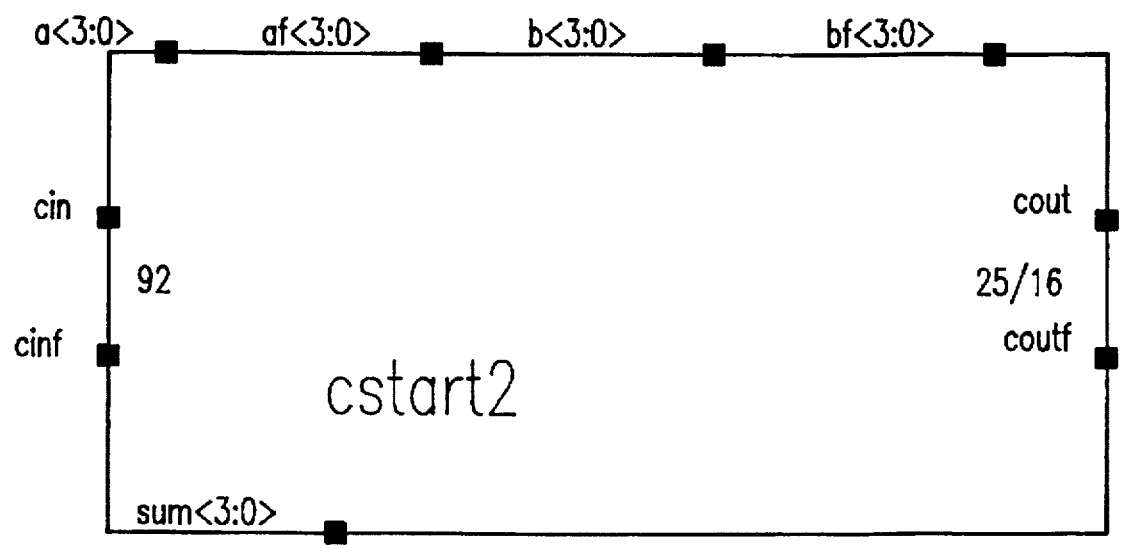
FIG. 16 is the CSTART2 module I/O definition.

Continuing with the description of the 64-bit integer adder implementation, the I/O definition of the CSTART2 carry start module is shown in FIG. 16. This block receives the next four bits of the operands. The operands are indicated as a<3:0> and its complement af<3:0>, b<3:0> and its complement bf<3:0>, the carry in cin and its complement cinf, the sum output s<3:0>, and the carry out cout and its complement coutf.

Figure 17:
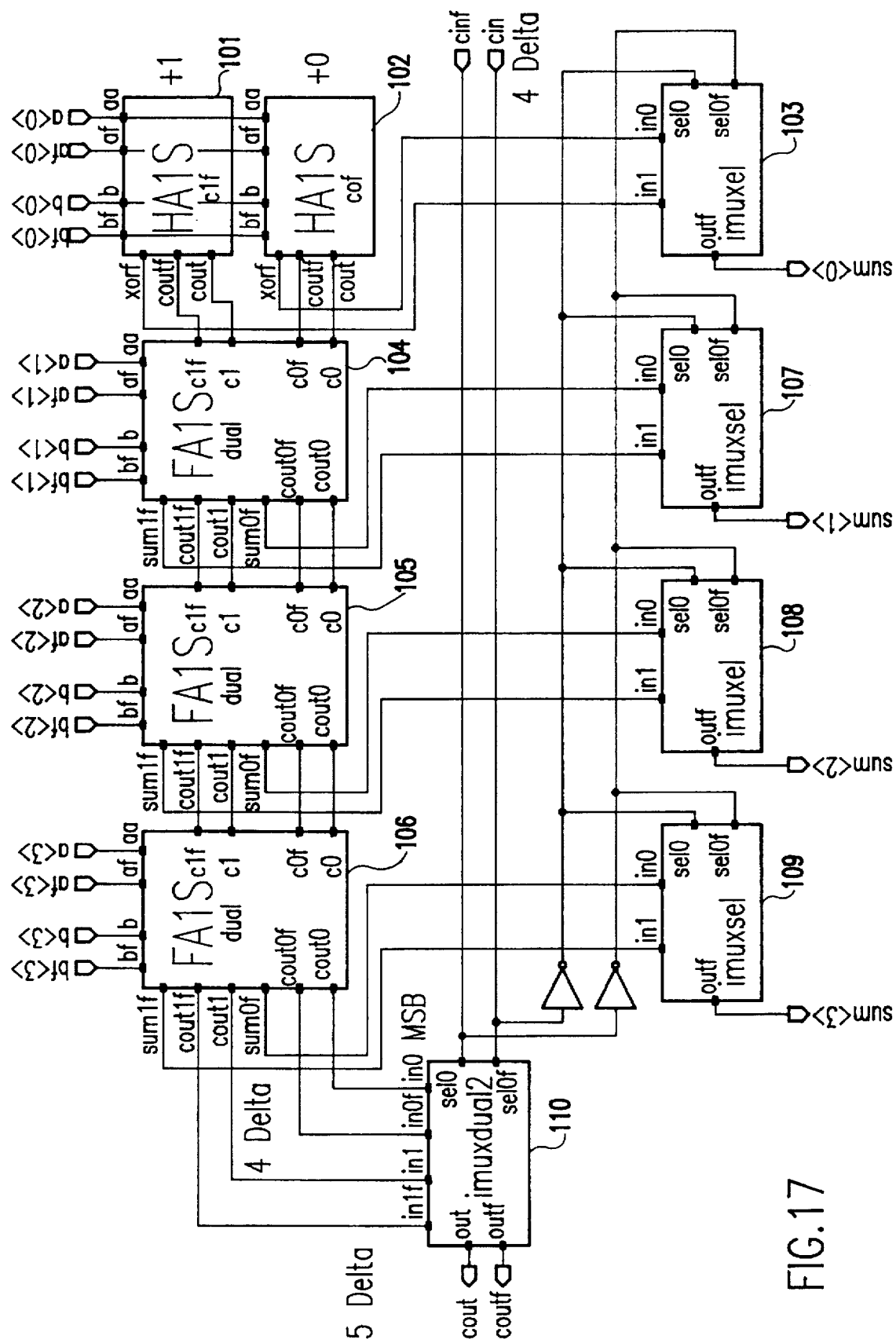
FIG. 17 is a block diagram of the CSTART2 module expanded into four unique submodules.

The CSTART2 module is shown in FIG. 17 as being comprised of five unique submodules, two half adder submodules, HA1S__C0 and HA1S__C1, a dual full adder submodule, FA1SDUAL, and two multiplexer submodules, IMUXSEL and IMUXDUAL2. The two half adders submodules are each used once, the dual full adder submodule is used three times, the first multiplexer submodule, IMUXSEL, is used three times, and the second multiplexer submodule, IMUXDUAL2, is used once. This submodule is composed of 282 FETs and the critical path is CIN→COUT.

In this module, the two half adder submodules 101 and 102 both receive the LSBs of the operands and generate candidate sum and carry outputs, on the assumption in half adder submodule 101 that the carry is a logic "1" and on the assumption in half adder submodule 102 that the carry is a logic "0". The sum outputs are input to a first multiplexer 103 and the outputs cout and coutf from each of the half adder submodules 101 and 102 are supplied to the first dual full adder submodule 104. The dual full adder submodules 104, 105 and 106 continue to generate candidate sum and carry outputs for each of the next succeeding three operand bits, with the sum signals being respectively supplied to multiplexers 107, 108 and 109. Finally, the candidate carry signals cout0 and cout1 and their complements are supplied to the dual multiplexer 110. The select signals sel0 and sel0f for each of the multiplexers are respectively the cinf and cin input signals which are generated from the preceding submodule. Again, the two inverters shown in the select lines are for purposes of drive and the logic values have been inverted to account for them.

Figure 18:
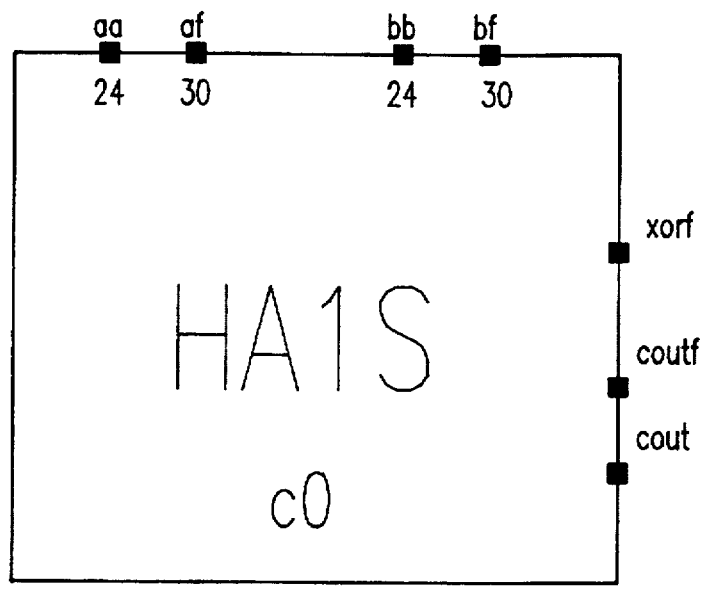
FIG. 18 is the HA1S__C0 submodule definition.

The IMUXSEL and IMUXDUAL2 submodules have been previously described with reference to FIGS. 12 to 15. FIG. 18 is the I/O definition of the HA1S__C0 half adder submodule. The operands are indicated as aa and its complement af, bb and its complement bf, a Exclusive OR output xor, and the carry out cout and its complement coutf.

Figure 19:
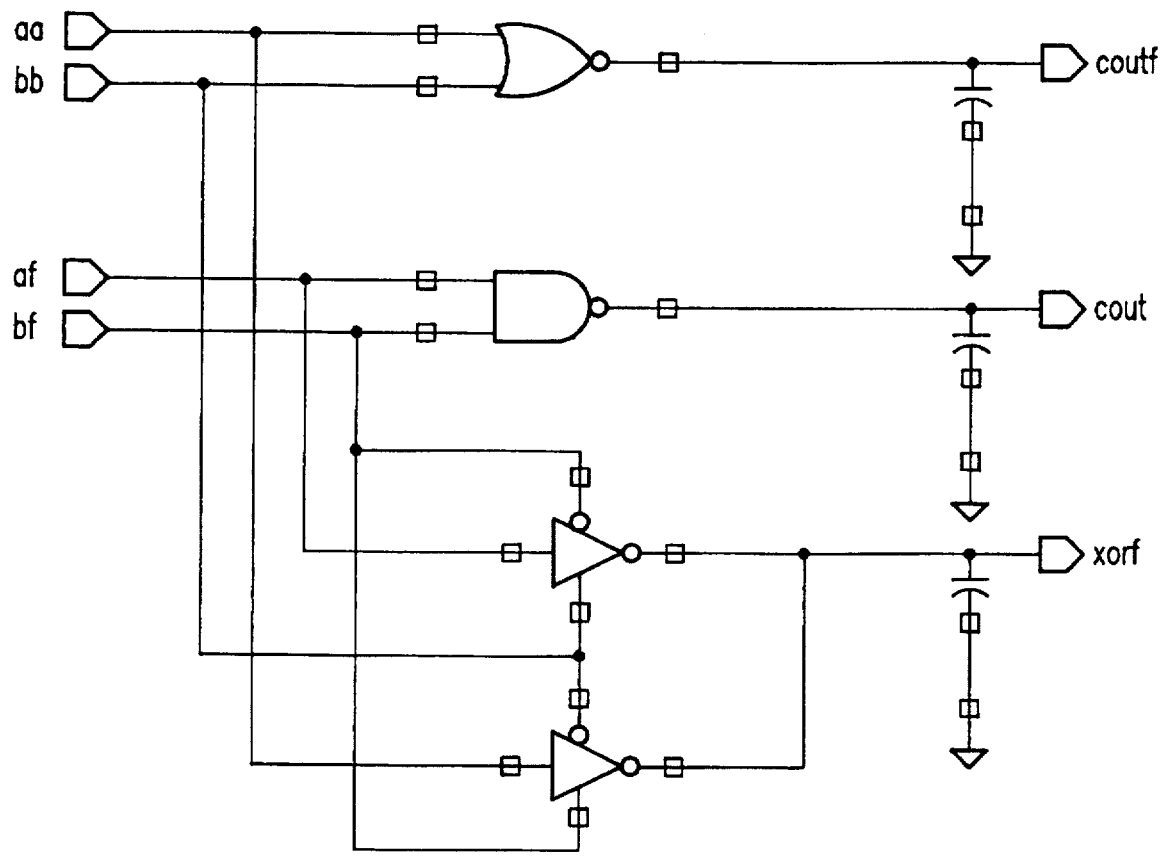
FIG. 19 is a schematic diagram of the HA1S__C0 submodule.

FIG. 19 shows the circuit of the HA1S-C0 half adder submodule as comprising a NAND gate 111, a NOR gate 112 and two tri-inverter buffer circuits 113 and 114. The two tri-inverter circuits 113 and 114 are connected to produce the XOR output of the input operands as described with reference to FIG. 10. The NAND gate 111 produces the coutf output from the aa and bb inputs, and the NOR gate 192 produces the cout output from the af and bf inputs.

Figure 20:
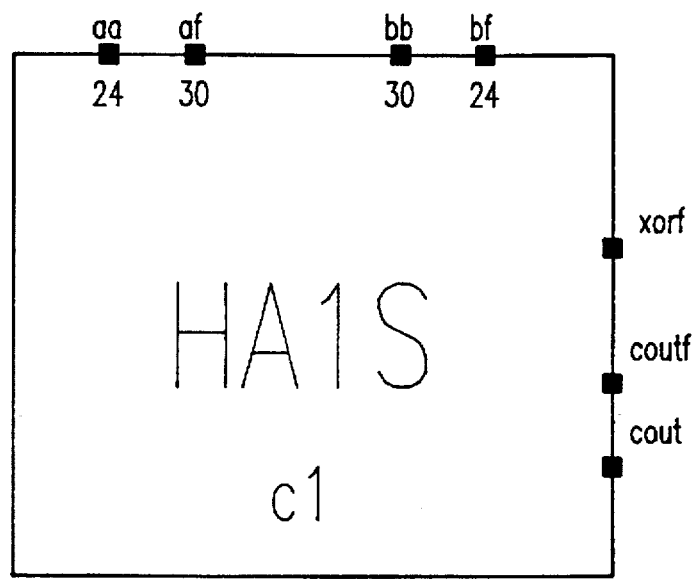
FIG. 20 is the HA 1S__C1 submodule definition.
Figure 21:
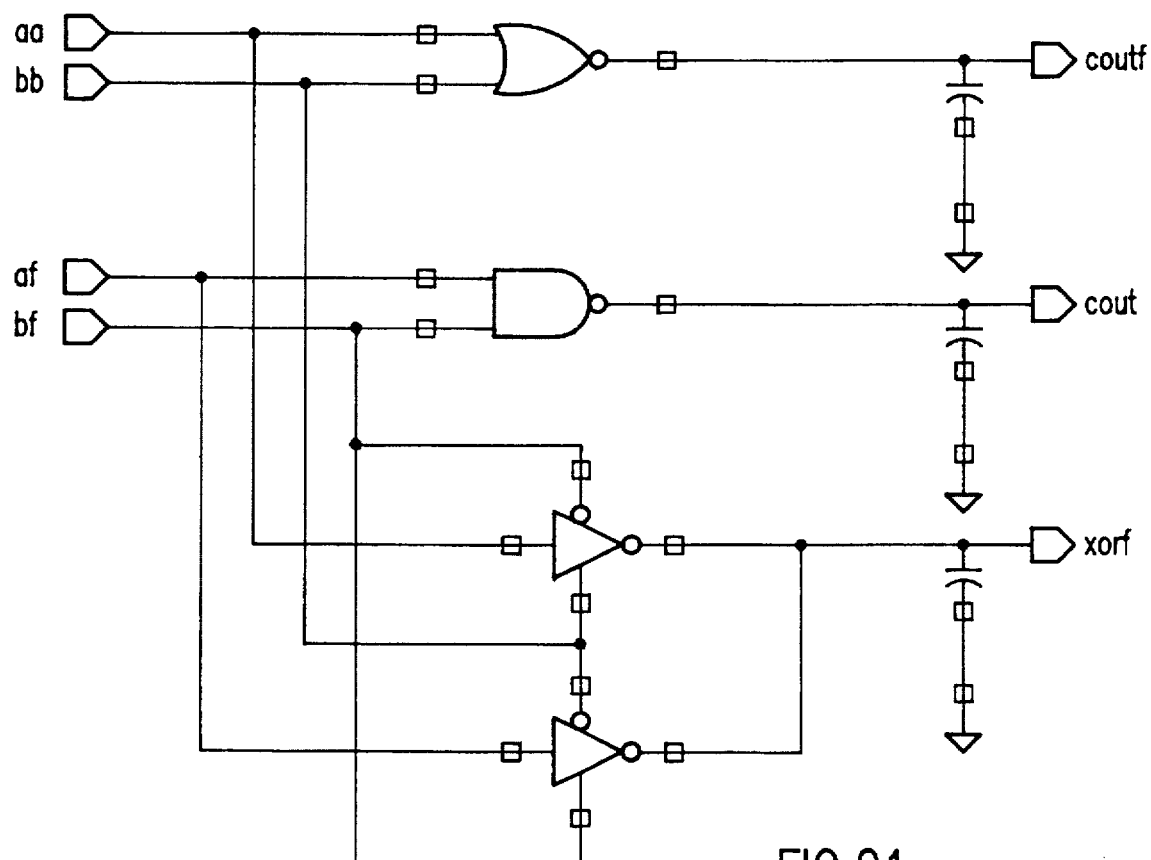
FIG. 21 is a schematic diagram of the HA1S__C1 submodule.

FIG. 20 is the I/O definition of the HA1S__C1 half adder submodule. The operands are indicated as aa and its complement af, bb and its complement bf, a complement of the Exclusive OR output xorf, and the carry out cout and its complement coutf. FIG. 21 shows the circuit of the HA1S_C1 half adder submodule which is essentially the same as that of the HA1S_C0 half adder submodule except that the tri-state buffers produce the xorf output, that is, the complement of the xor output. It will be observed that the HA1S-C0 and HA1S-C1 half adder submodules are structurally identical except for the wiring of the inputs aa, af, bb, and bf, hence the difference in their outputs.

Figure 22:
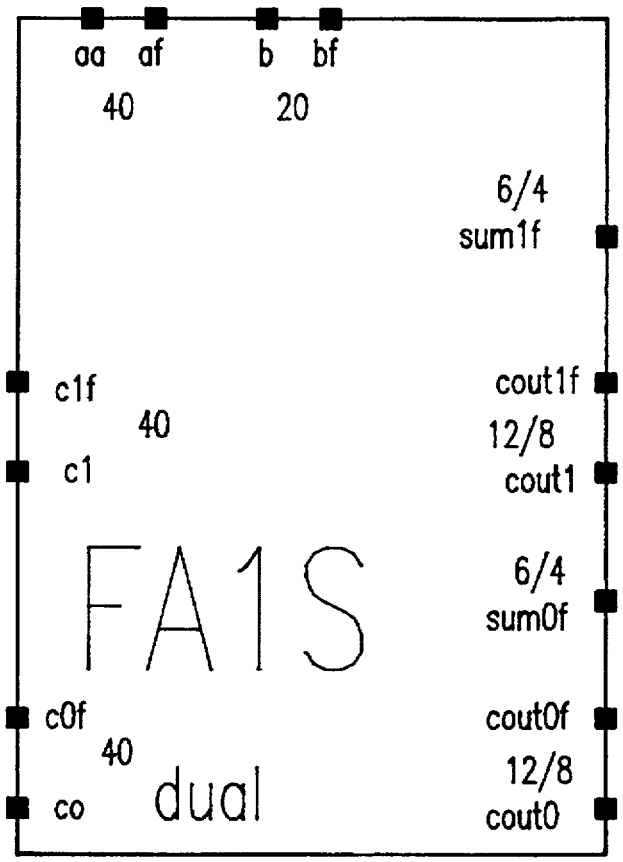
FIG. 22 is the FA1S__DUAL submodule I/O definition.

FIG. 22 is the I/O definition of the FA1SDUAL dual full adder submodule. The operands are indicated as aa and its complement af, b and its complement bf, two carry in inputs c0 and c1 and their complements c0f and c1f, the complements of two sum outputs sum0f and sum1f, and two carry out outputs cout0 and cout1 and their complements cout0f and cout1f.

Figure 23:
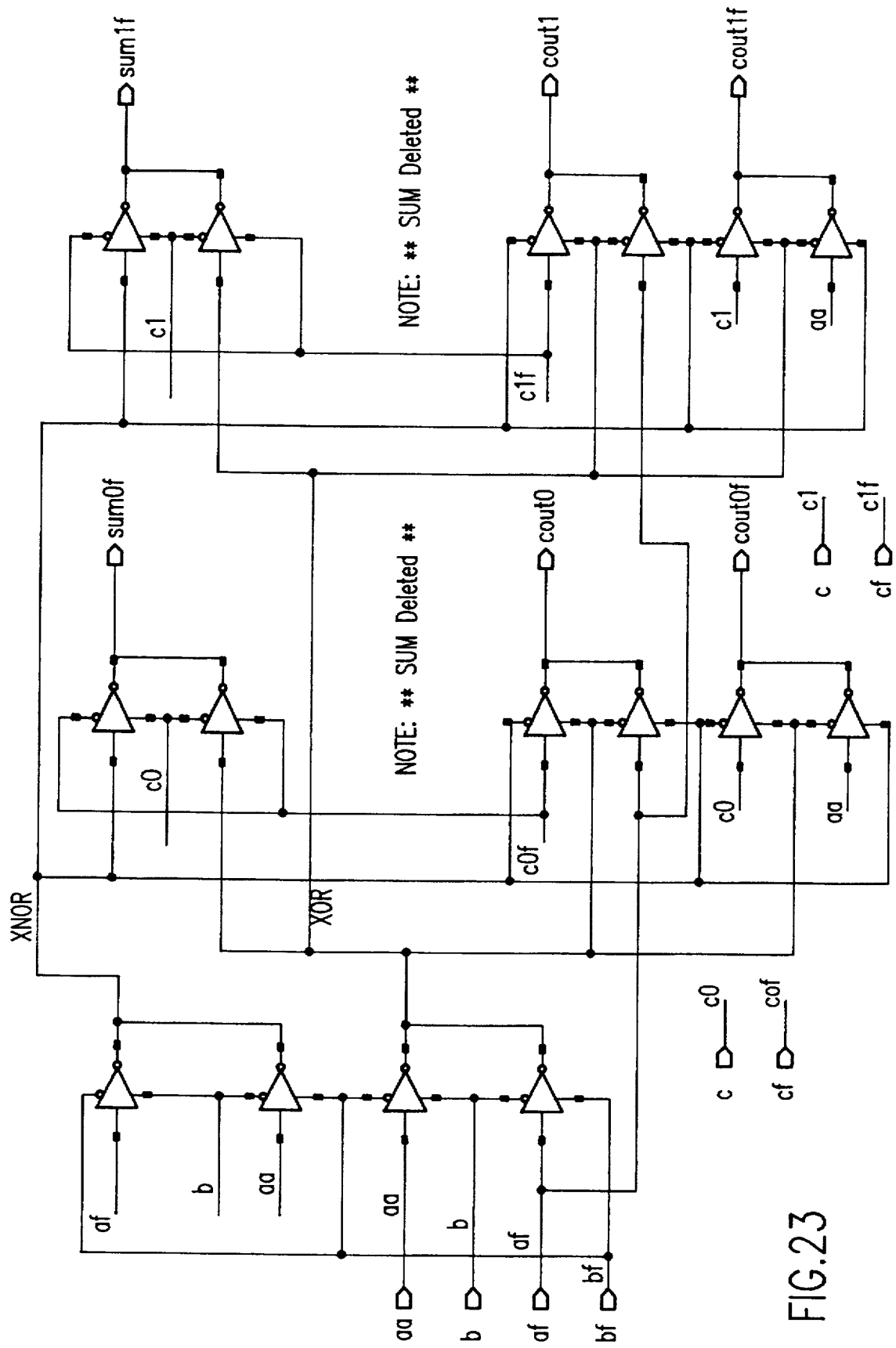
FIG. 23 is a schematic diagram of the FA1S__DUAL submodule.

FIG. 23 shows the circuit of the FA1SDUAL dual full adder submodule as comprising sixteen tri-inverter buffer circuits, each of which is composed of four FETs, for a total FET count of sixty-four FETs. This circuit is similar to that of FIG. 12 with the addition of six tri-inverter buffer circuits to generate the additional sum and carry out outputs.

Figure 24:
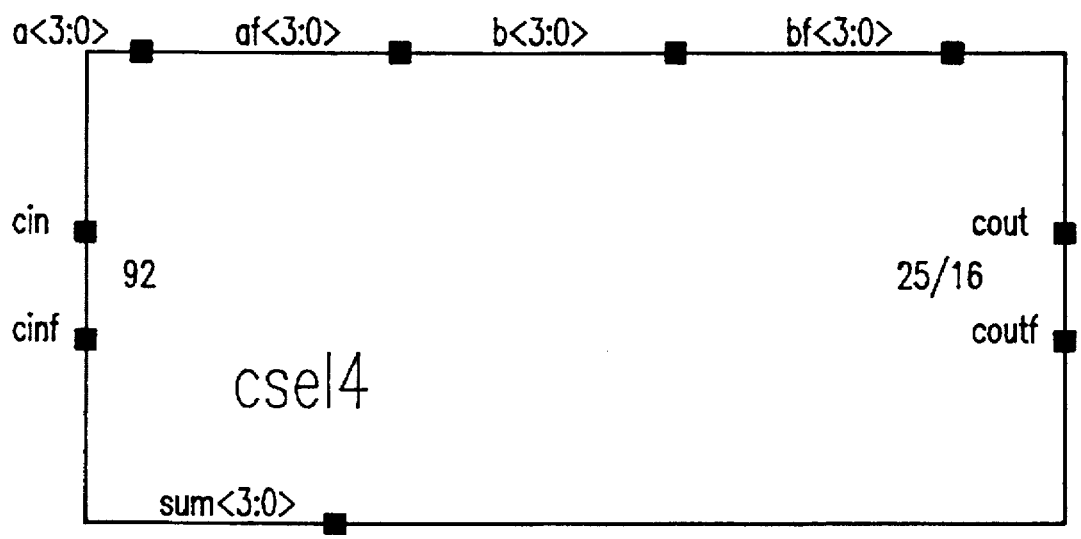
FIG. 24 is the CSEL4 module I/O definition.

The I/O definition for the CSEL4 carry select submodule is shown in FIG. 24. This is the last two of the four modules that comprise the "low 16" building block shown in FIG. 4. Each of these modules receive the next successive groups of four bits. The operands are indicated as a<3:0> and its complement af<3:0>, b<3:0> and its complement bf<3:0>, the carry in cin and its complement cinf, the sum output s<3:0>, and the carry out cout and its complement coutf.

Figure 25:
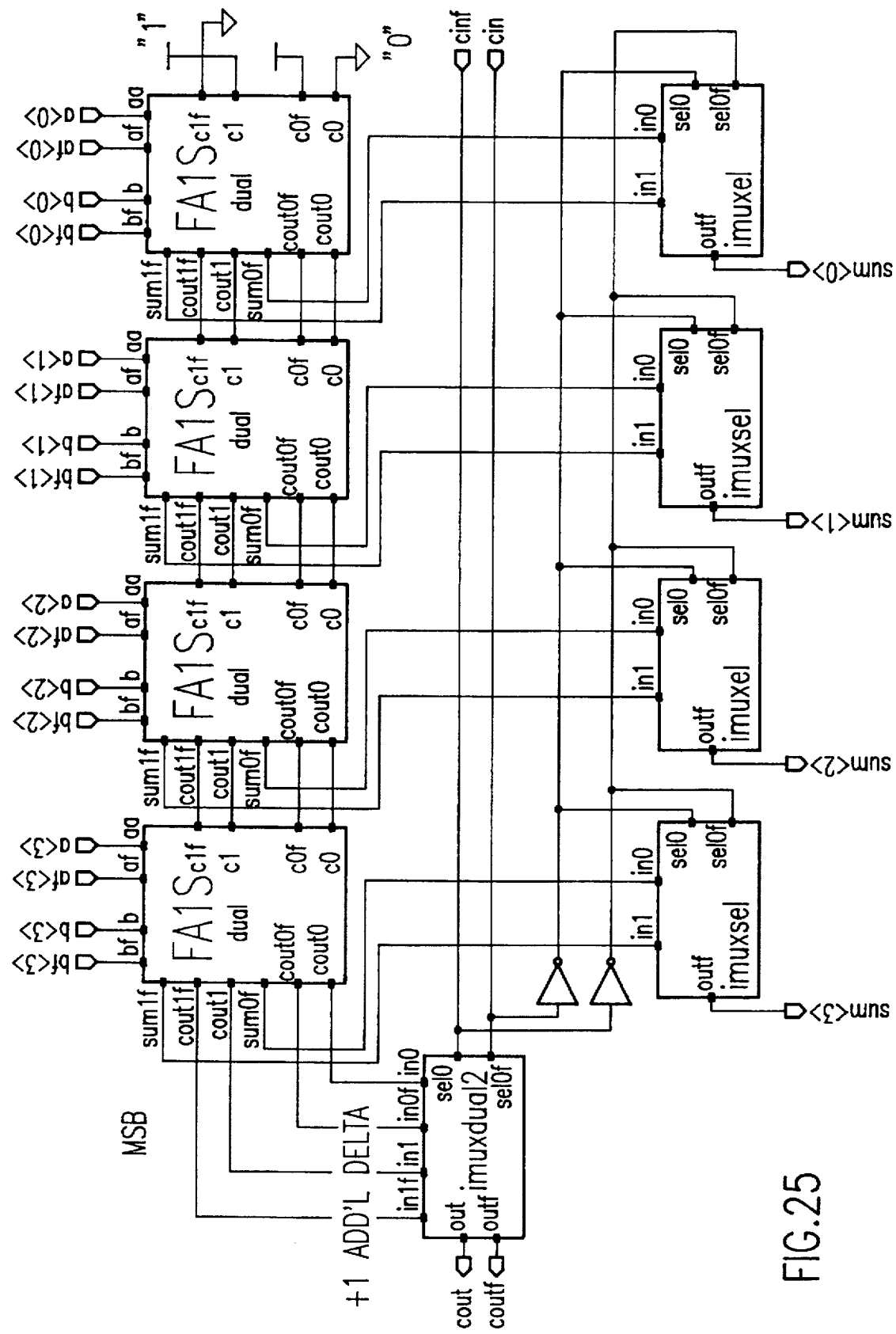
FIG. 25 is a block diagram of the CSEL4 submodule expanded into three unique submodules.

The CSEL4 carry select module is shown in FIG. 25 as being comprised of three unique submodules, the full adder submodule, FA1SDUAL, and the multiplexer submodules, IMUXSEL and IMUXDUAL. The dual full adder submodule, FA1SDUAL, is used four times, the first multiplexer submodule, IMUXSEL, is used four times, and the second multiplexer submodule, IMUXDUAL, is used once. Each of these submodules have been previously described, the FA1SDUAL submodule with reference to FIG. 23, the IMUXSEL submodule with reference to FIG. 10, and the IMUXDUAL submodule with reference to FIG. 15.

It will be observed that CSEL4 carry select module shown in FIG. 25 is basically the same as the CSTART2 module shown in FIG. 17 except for the substitution of the dual full adder submodule 121 for the two half adder submodules 101 and 102. However, as in the CSTART2 module, the dual full adder submodule includes one full adder which generates candidate sum and carry outputs based on the assumption that the input carry is a logic "1" while the other full adder generates candidate sum and carry outputs based on the assumption that the input carry is a logic "0".

Figure 26:
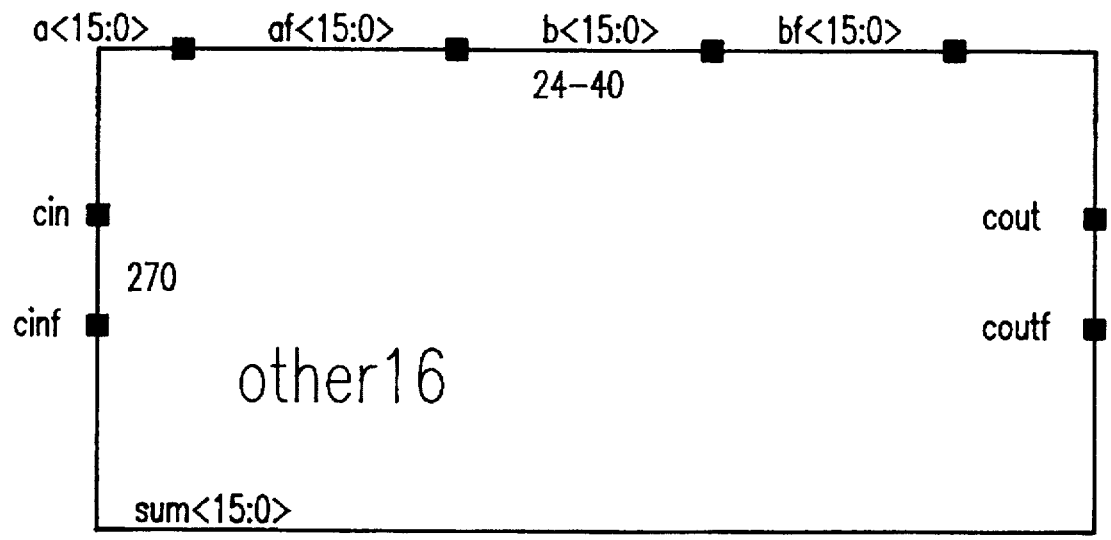
FIG. 26 is the "other" 16 building block I/O definition.

The I/O definition for the "other 16" building blocks which make up the rest of the 64-bit adder unit shown in FIG. 2 is shown in FIG. 26. Each of these building blocks receive groups of sixteen bits. The operands are indicated as a<15:0> and its complement af<15:0>, b<15:0> and its complement bf<15:0>, the carry in cin and its complement cinf, the sum output s<15:0>, and the carry out cout and its complement coutf.

The "other 16" building block is shown in FIG. 27 as comprising four carry select modules, CSEL4NCM, and ten dual multiplexer submodules, IMUXDUAL. Each of the carry select modules 141, 142 143, and 144 receive four bits of each of the operands as inputs and generates four bits of the 16-bit sum output for the "other 16" building block. The first carry select module 142 receives the cin and cinf signals and generates candidate carry output signals, c0 and c1 and their complements c0f and c1f. These candidate signals are input to the first dual multiplexer 145 which selects one of the pairs of candidate signals and passes them to the cin and cinf inputs of the next carry select submodule 142. The selection signals sel0 and sel0f for dual multiplexer 145 are respectively cinf and cin. Meanwhile, the candidate carry output signals, c0 and c1 and their complements c0f and c1f, from carry select module 142 are input to a pair of dual multiplexers 146 and 147, the outputs of which are supplied to another dual multiplexer 148. The selection signals sel0 and sel0f for dual multiplexers 146 and 147 are respectively the c1 and c1f signals and the c0 and c0f signals output from carry select module 141. Similar connections are made for dual multiplexers 149, 150 and 151 and for dual multiplexers 152, 153 and 154. The critical path is CIN→COUT.

Figure 28:
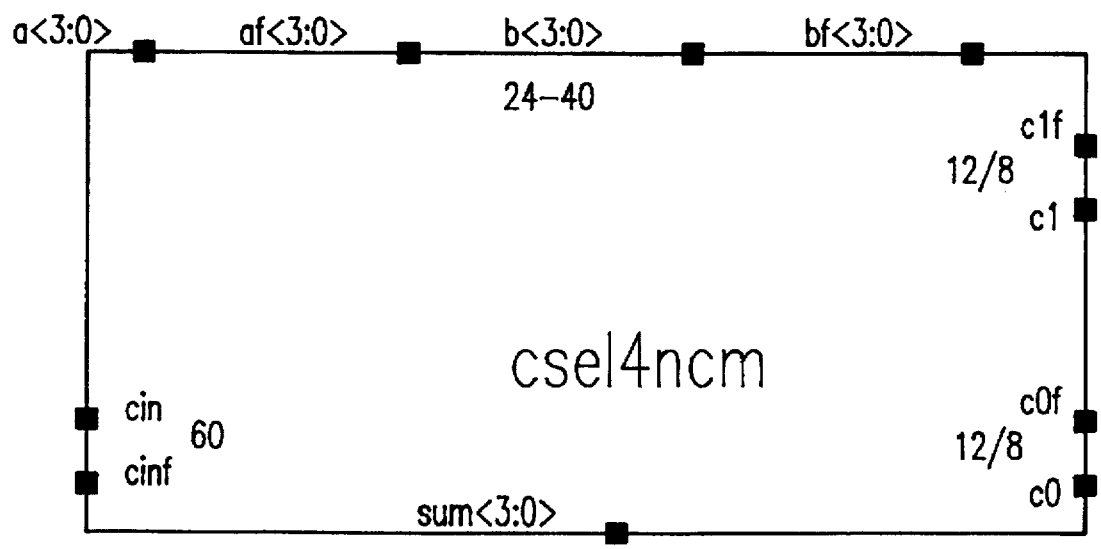
FIG. 28 is the CSEL4NCM module I/O definition.

The I/O definition of the CSEL4NCM carry select module is shown in FIG. 28. This block receives the four bits of the operands. The operands are indicated as a<3:0> and its complement af<3:0>, b<3:0> and its complement bf<3:0>, the carry in cin and its complement cinf, the sum output s<3:0>, and the carry out cout and its complement coutf.

Figure 29:
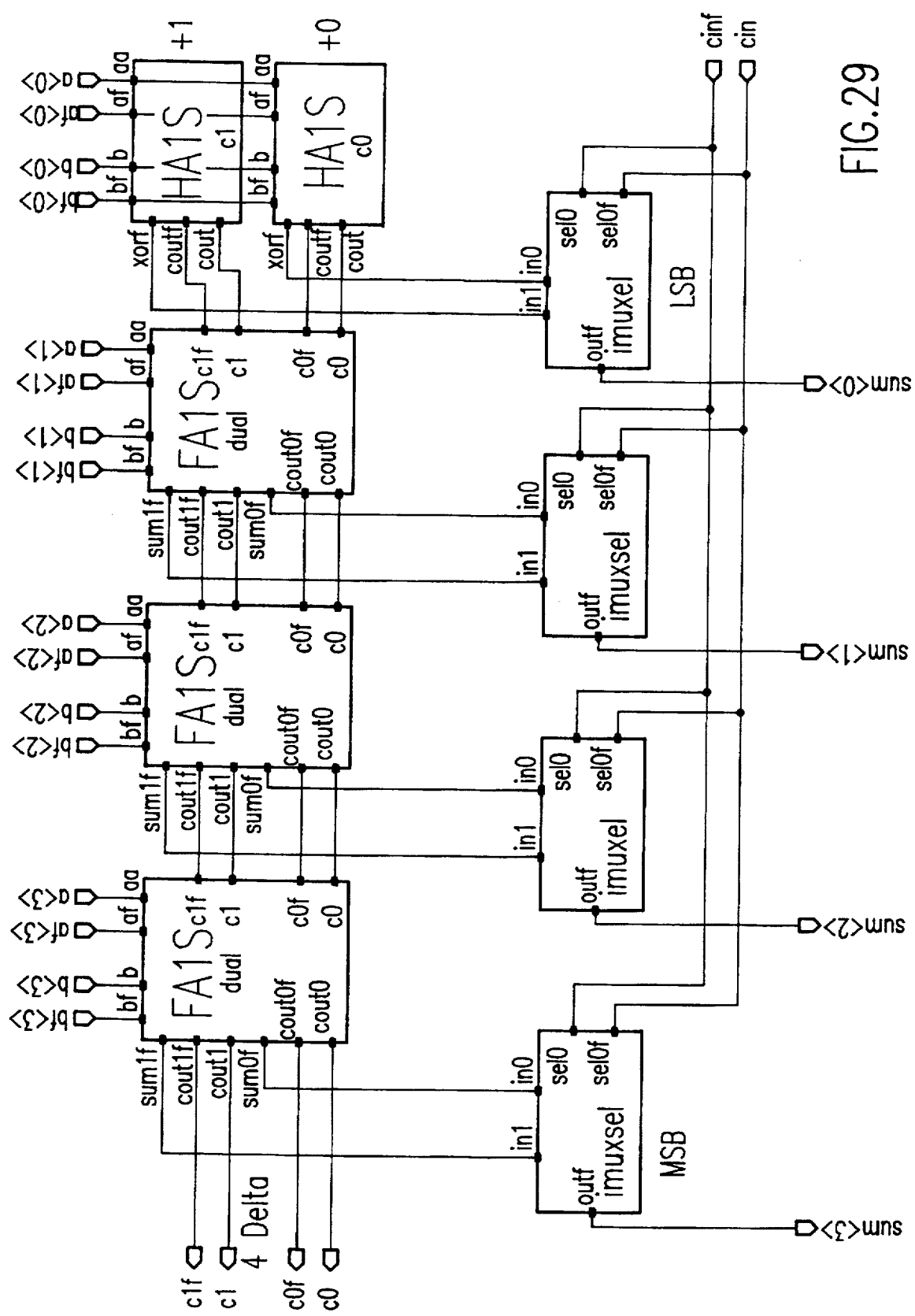
FIG. 29 is a schematic diagram of the CSEL4NCM module expanded into three unique submodules.

The CSEL4NCM carry select module is shown in FIG. 29 as being comprised of four unique submodules, two half adder submodules, HA1S_C0 and HA1S_C1, a dual full adder submodule, FA1SDUAL, and a multiplexer submodule, IMUXSEL. The two half adder submodules, HA1S_C0 and HA1S_C1, are each used once, the dual full adder submodule, FA1SDUAL, is used three times, and the multiplexer submodule, IMUXSEL, is used four times. As can be seen from a comparison with FIG. 17, the CSEL4NCM carry select module is essentially the same as the carry start module CSTART2 except for the final dual multiplexer 110.

Each of the submodules shown in FIG. 29 has been previously described, the half adder submodules with reference to FIGS. 19 and 21, the dual full adder with reference to FIG. 23, and the multiplexer with reference to FIG. 10. This cell does not participate in the critical path except the topmost slice, which must enable both COUT and SUM bits.

Briefly summarizing, the 64-bit integer adder according to the specific disclosed example is constructed as follows:

ADD64 (FIGS. 1 & 2)
  I. "low 16" building block (FIGS. 3 & 4)
    A. CSTART module (FIGS. 5 & 6)
      1. FA1S_A2 submodule (FIG. 7)
        a. five pairs of tri-inverter buffer circuits (FIG. 8)
          (a) each composed of four FETs (FIG. 9)
      2. FA1S_A3 submodule (FIG. 11)
        a. five pairs of tri-inverter buffer circuits (FIG. 12)
          (1) each composed of four FETs (FIG. 9)
      3. IMUXSEL submodule (FIG. 13)
        a. a pair of tri-inverter buffer circuits (FIG. 10)
          (1) each composed of four FETs (FIG. 9)
      4. IMUXDUAL submodule (FIG. 14)
        a. two pairs of tri-inverter buffer circuits (FIG. 15)
          (1) each composed of four FETs (FIG. 9)
    B. CSTART2 module (FIGS. 16 & 17)
      1. HA1S_C0 submodule (FIGS. 18 & 19)
        a. a pair of tri-inverter buffer circuits
          (1) each composed of four FETs (FIG. 9)
        b. a NAND gate
        c. a NOR gate
      2. HA1S_C1 submodule (FIGS. 20 & 21)
        a. a pair of tri-inverter buffer circuits
          (1) each composed of four FETs (FIG. 9)

-continued

```
    b. a NAND gate
    c. a NOR gate
  3. FA1SDUAL submodule (FIG. 22)
    a. eight pairs of tri-inverter buffer circuits
       (FIG. 23)
       (1) each composed of four FETs (FIG. 9)
  4. IMUXSEL submodule (FIG. 13)
    a. a pair of tri-inverter buffer circuits (FIG. 10)
       (1) each composed of four FETs (FIG. 9)
  5. IMUXDUAL2 submodule (FIG. 14)
    a. two pairs of tri-inverter buffer circuits
       (FIG. 15)
       (1) each composed of four FETs (FIG. 9)
 C. CSEL4 module (FIGS. 24 & 25)
  1. FA1SDUAL submodule (FIG. 22)
    a. eight pairs of tri-inverter buffer circuits
       (FIG. 23)
  2. IMUXSEL submodule (FIG. 13)
    a. a pair of tri-inverter buffer circuits (FIG. 10)
       (1) each composed of four FETs (FIG. 9)
  3. IMUXDUAL2 submodule (FIG. 14)
    a. two pairs of tri-inverter buffer circuits
       (FIG. 15)
       (1) each composed of four FETs (FIG. 9)
II. "other" 16 building blocks (FIGS. 26 & 27)
 A. CSEL4NCM module (FIG. 28)
  1. HA1S_C0 submodule (FIGS. 18 & 19)
    a. a pair of tri-inverter buffer circuits
       (1) each composed of four FETs (FIG. 9)
    b. a NAND gate
    c. a NOR gate
  2. HA1S_C1 submodule (FIGS. 18 & 19)
    a. a pair of tri-inverter buffer circuits
       (1) each composed of four FETs (FIG. 9)
    b. a NAND gate
    c. a NOR gate
  3. FA1SDUAL submodule (FIG. 22)
    a. eight pairs of tri-inverter buffer circuits
       (1) each composed of four FETs (FIG. 9)
  4. IMUXSEL submodule (FIG. 13)
    a. a pair of tri-inverter buffer circuits
       (1) each composed of four FETs (FIG. 9)
 B. IMUXDUAL module (FIG. 14)
  1. two pairs of tri-inverter buffer circuits
    a. each composed of four FETs (FIG. 9)
 C. IMUXDUAL2 module (FIG. 14)
  1. two pairs of tri-inverter buffer circuits
    a. each composed of four FETs (FIG. 9)
 D. IMUXDUAL4 (FIG. 14)
  1. two pairs of tri-inverter buffer circuits
    a. each composed of four FETs (FIG. 9)
```

From this summary, it will be apparent that the invention provides an adder implementation having a low total FET count and low local and no global interconnect requirements to provide a small physical layout. The invention may be used to implement 32-bit or 64-bit or larger adders based on the 16-bit building blocks used. The nested carry select architecture which is unique to the present invention permits the simple high density and inexpensive modular construction of the adder. Thus, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A modular integer adder unit composed of two different basic 16-bit adder building blocks, a first of said two building blocks receiving sixteen least significant bits for each of two operands, there being two or more of a second basic building block receiving remaining operand bits in groups of sixteen, each of said first and second basic building blocks being connected through a carry signal and a complement of the carry signal, said first and second basic building blocks being composed of a plurality of modules and each of said modules in turn being composed of a plurality of submodules, said submodules, modules and basic building blocks being dual rail logic circuits with a dual carry select path so as to constitute a nested carry select architecture wherein the nesting of the dual carry select path extends from submodules to a module and from modules to a basic building block and from basic building blocks to said modular integer adder unit, said modular integer adder unit achieving a one gate delay increment for each additional 16-bit adder building block after the first.

2. The modular integer adder unit recited in claim 1, wherein processing time is measured in gate delays, wherein least significant sum outputs are produced by said first basic building block at a faster rate than more significant sum outputs by said second basic building block, each said second basic building block being designed to add one gate delay, and wherein each of said first and second building blocks is composed of a respective set of four modules respectively receiving four of sixteen operand bits for each of said two operands, each module composed of a plurality of submodules arranged to receive four operand bits for each of said two operands, wherein the respective modules and submodules of said first basic building block process least significant bits at a faster rate than more significant bits and wherein modules and submodules processing more significant bits are designed to add one delay gate, and each submodule including logic circuitry for generating separate carry and complemented carry signals in two respective paths based on assumed preceding carry and complemented carry values being a logic "1" and a logic "0" respectively and a selection circuit responsive to a selection signal for selecting a correct carry and complemented carry signals, said selection signal being generated based on an earlier stage generation of carry and complemented carry signals.

3. The modular integer adder unit recited in claim 2, wherein said first building block comprises a first carry start module and at least a second carry start module, said first carry start module in turn being composed of six full adder submodules and three multiplexer submodules, first and second of said full adder submodules respectively receiving first and second bits of said first and second operands and propagating true and complement input carry signals and generating respective first and second sum bit outputs, third and fourth full adder submodules receiving third bits of said first and second operands and respective prewired assumed true and complement and complement and true carry signals, fifth and sixth of said full adder modules receiving fourth bits of said first and second operands and propagated carry signals from said third and fourth of said full adder modules, each of said third to sixth full adder submodules generating sum outputs based on said assumed carry signals, a first of said multiplexer submodules receiving third sum bits from said third and fourth of said full adder submodules, a second of said multiplexer submodules receiving fourth sum bits from the fifth and sixth of said full adder submodules, and a third of said second multiplexer submodules receiving true and complement carry signals from said fifth and sixth of said full adder submodules, true and complement carry signals from said second full adder submodules controlling said first and second multiplexer submodules to select third and fourth sum bits and controlling said third multiplexer submodules to select true and complement carry signals output by the first carry start module.

4. The modular integer adder unit recited in claim 3, wherein said second carry start module is in turn being composed of two half adder submodules, three dual full adder submodules, and four multiplexer submodules, first and second of said half adder submodules receiving low order bits of one of four bits of said first and second operands and respectively prewired to generate assumed true and complement and complement and true carry signals and respectively generating low order sum bits based on prewired true and complement orders of said low order bits, first, second and third dual full adder submodules respectively receiving second, third and fourth bits of four bits of said first and second operands, said first dual full adder submodule receiving propagated carry signals from said first and second half adder submodules based on said assumed carry signals and said first, second and third dual full adder submodules generating second, third and fourth pairs of sum bits based on propagation of said assumed carry signals, fourth, fifth, sixth and seventh multiplexer submodules respectively connected to receive sum bits generated by said first and second half adder submodules and said first, second and third dual full adder submodules and eighth multiplexer submodule connected to receive respective true and complement carry signals from said third dual adder submodule, said fourth through eighth multiplexer submodules being controlled by true and complement carry signals propagated by a preceding start submodule to select respectively four sum bits and true and complement carry signals output by the second carry start submodule.

5. The modular integer adder unit recited in claim 4 wherein each of said first, second, third and fourth full adder submodules are comprised of five pairs of tri-inverter buffer circuits, each of said first, second and third dual full adder submodules are comprised of eight pairs of tri-inverter buffer circuits, said first, second, and fourth through seventh multiplexer submodules are each comprised of a pair of tri-inverter buffer circuits, said third and eighth multiplexer submodules are each comprised of two pairs of tri-inverter buffer circuits, and each of said first and second half adder submodules is comprised of a pair of tri-inverter buffer circuits, a NAND gate and a NOR gate, said NAND gate and said NOR gate generating true and complement carry output signals based on true and complement values of said low order one of four bits.

6. The modular integer adder unit recited in claim 5 wherein each of said tri-invert buffer circuits is composed of four field effect transistors (FETs).

7. The modular integer adder unit recited in claim 4 wherein said second building block is composed of four carry select modules and ten multiplexer modules, each of said carry select modules respectively receiving four of sixteen bits of said first and second operands and generating four of sixteen output sum bits and generating assumed true and complement and complement and true carry outputs, a first multiplexer module receiving carry outputs from a first carry select module and selecting carry outputs to a second carry select module, second and third multiplexer modules receiving carry output signals from said second carry select module and selecting carry output signals to a fourth multiplexer module based on carry output signals from said first carry select module, said fourth multiplexer module selecting carry signals to a third carry select module, fifth and sixth multiplexer modules receiving carry output signals from said third carry select module and selecting carry output signals to a seventh multiplexer module based on carry output signals from said third and fourth multiplexer modules, said seventh multiplexer module selecting carry signals to a fourth carry select module, eighth and ninth multiplexer modules receiving carry output signals from said fourth carry select module and selecting carry output signals to a tenth multiplexer module based on carry output signals from said fifth and sixth multiplexer modules, said first, fourth, seventh and tenth multiplexer modules being controlled by carry signals propagated from a preceding building block.

8. The modular integer adder unit recited in claim 7 wherein each of said carry select modules is composed of two half adder submodules, three dual full adder submodules and four multiplexer submodules, first and second of said half adder submodules receiving low order bits of one of four bits of said first and second operands and respectively prewired to generate assumed true and complement and complement and true carry signals and respectively generating low order sum bits based on prewired true and complement orders of said low order bits, first, second and third dual full adder submodules respectively receiving second, third and fourth bits of four bits of said first and second operands, said first dual full adder submodule receiving propagated carry signals from said first and second half adder submodules based on said assumed carry signals and said first, second and third dual full adder submodules generating second, third and fourth pairs of sum bits based on propagation of said assumed carry signals, fourth, fifth, sixth and seventh multiplexer submodules respectively connected to receive sum bits generated by said first and second half adder submodules and said first, second and third dual full adder submodules and eighth multiplexer submodule connected to receive respective true and complement carry signals from said third dual adder submodule, said fourth through eighth multiplexer submodules being controlled by true and complement carry signals propagated by a preceding start submodule to select respectively four sum bits and true and complement carry signals output by the second carry start submodule.

* * * * *

UNITED STATES PATENT AND TRADEMARK OFFICE
CERTIFICATE OF CORRECTION

PATENT NO. : 5,636,157
DATED : June 3, 1997
INVENTOR(S) : Hesson et al.

It is certified that error appears in the above-indentified patent and that said Letters Patent is hereby corrected as shown below:

Column 2, line 35, delete "FA1S$_{13}$" and insert --FA1S_A2--; and
Column 2, line 36, delete "FA1S$_{13}$" and insert --FA1S_A2--.

Signed and Sealed this

Second Day of September, 1997

Attest:

BRUCE LEHMAN

Attesting Officer

Commissioner of Patents and Trademarks